US010477756B1

(12) United States Patent
Richt et al.

(10) Patent No.: US 10,477,756 B1
(45) Date of Patent: Nov. 19, 2019

(54) CORRECTING AGRONOMIC DATA FROM MULTIPLE PASSES THROUGH A FARMABLE REGION

(71) Applicant: CiBO Technologies, Inc., Cambridge, MA (US)

(72) Inventors: Ryan Richt, St. Louis, MO (US); Jason Michael Rute, Somerville, MA (US); Joel Phillip Skelton, Pasadena, CA (US)

( * ) Notice: Subject to any disclaimer, the term of this patent is extended or adjusted under 35 U.S.C. 154(b) by 0 days.

(21) Appl. No.: 15/873,688

(22) Filed: Jan. 17, 2018

(51) Int. Cl.
*G06K 9/20* (2006.01)
*G06F 16/29* (2019.01)
*G06Q 10/06* (2012.01)
*A01B 79/00* (2006.01)

(52) U.S. Cl.
CPC ............ *A01B 79/005* (2013.01); *G06F 16/29* (2019.01); *G06Q 10/063* (2013.01); *G06K 9/2054* (2013.01)

(58) Field of Classification Search
None
See application file for complete search history.

(56) References Cited

U.S. PATENT DOCUMENTS

| | | |
|---|---|---|
| 6,505,146 B1 | 1/2003 | Blackmer |
| 6,999,877 B1 | 2/2006 | Dyer et al. |
| 7,184,892 B1 | 2/2007 | Dyer et al. |
| 8,078,367 B2 | 12/2011 | Sauder et al. |
| 9,009,087 B1 | 4/2015 | Mewes et al. |
| 9,202,252 B1 | 12/2015 | Smith et al. |
| 9,322,629 B2 | 4/2016 | Sauder et al. |
| 9,519,861 B1 | 12/2016 | Gates et al. |
| 9,881,214 B1 | 1/2018 | Zhong et al. |
| 10,028,451 B2 | 7/2018 | Rowan et al. |
| 10,319,050 B2 | 6/2019 | Richt |
| 2001/0016053 A1 | 8/2001 | Dickson et al. |

(Continued)

FOREIGN PATENT DOCUMENTS

| | | |
|---|---|---|
| CA | 2663917 A1 | 10/2010 |
| WO | WO-2012/174134 A1 | 12/2012 |

(Continued)

OTHER PUBLICATIONS

Nuske, Stephen, et al. "Automated visual yield estimation in vineyards." Journal of Field Robotics 31.5 (2014): 837-860.*

(Continued)

*Primary Examiner* — G Steven Vanni
(74) *Attorney, Agent, or Firm* — Goodwin Procter LLP

(57) ABSTRACT

Inaccurate agronomic data may be identified and corrected by obtaining agronomic data indicating areas of sub-regions of a farmable region and value for the sub-regions, wherein the value for each sub-region includes an aggregate value of an agronomic parameter for the sub-region and/or a ratio of the aggregate value to the area of the sub-region; identifying a part of a first sub-region that overlaps a part of a second sub-region; determining whether the second sub-region is associated with a first pass or a second pass by a sensor through the overlapping parts; and if the second sub-region is associated with the second pass, determining an adjusted value for the second sub-region based on the value for the first sub-region, the value for the second sub-region, the area of the first sub-region, the area of the second sub-region, and/or an area of the overlapping parts.

30 Claims, 10 Drawing Sheets

(56) References Cited

U.S. PATENT DOCUMENTS

| | | |
|---|---|---|
| 2002/0103688 A1 | 8/2002 | Schneider |
| 2003/0018431 A1 | 1/2003 | Hanson |
| 2005/0096849 A1 | 5/2005 | Sorrells |
| 2005/0234753 A1 | 10/2005 | Pinto et al. |
| 2006/0015374 A1 | 1/2006 | Ochs et al. |
| 2006/0287896 A1 | 12/2006 | McComb et al. |
| 2007/0174095 A1 | 7/2007 | McComb et al. |
| 2007/0255502 A1 | 11/2007 | Pruett et al. |
| 2009/0203526 A1 | 8/2009 | Haikal et al. |
| 2009/0234695 A1 | 9/2009 | Kapadi et al. |
| 2010/0241590 A1 | 9/2010 | Moore |
| 2010/0306012 A1 | 12/2010 | Zyskowski et al. |
| 2012/0083907 A1 | 4/2012 | Motavalli et al. |
| 2012/0101634 A1 | 4/2012 | Lindores |
| 2012/0101861 A1 | 4/2012 | Lindores |
| 2012/0109614 A1 | 5/2012 | Lindores |
| 2012/0226517 A1 | 9/2012 | Sitaram |
| 2013/0139277 A1 | 5/2013 | Tierney |
| 2013/0174040 A1 | 7/2013 | Johnson |
| 2013/0198693 A1 | 8/2013 | Jost et al. |
| 2013/0332205 A1 | 12/2013 | Friedberg et al. |
| 2014/0012732 A1 | 1/2014 | Lindores |
| 2014/0129146 A1 | 5/2014 | Romier |
| 2014/0278731 A1 | 9/2014 | Griffin et al. |
| 2014/0358486 A1 | 12/2014 | Osborne |
| 2015/0201605 A1 | 7/2015 | Groeneveld |
| 2015/0278640 A1 | 10/2015 | Johnson et al. |
| 2015/0302305 A1 | 10/2015 | Rupp et al. |
| 2015/0370935 A1 | 12/2015 | Starr |
| 2016/0003792 A1 | 1/2016 | Owens et al. |
| 2016/0018380 A1 | 1/2016 | Gerber-Siff et al. |
| 2016/0050840 A1 | 2/2016 | Sauder et al. |
| 2016/0066505 A1 | 3/2016 | Bakke et al. |
| 2016/0071223 A1 | 3/2016 | Rupp et al. |
| 2016/0071410 A1 | 3/2016 | Rupp et al. |
| 2016/0073573 A1 | 3/2016 | Ethington et al. |
| 2016/0078375 A1 | 3/2016 | Ethington et al. |
| 2016/0078569 A1 | 3/2016 | Ethington et al. |
| 2016/0078570 A1 | 3/2016 | Ethington et al. |
| 2016/0110812 A1 | 4/2016 | Mun |
| 2016/0125331 A1 | 5/2016 | Vollmar et al. |
| 2016/0180473 A1 | 6/2016 | Groeneveld |
| 2016/0202227 A1 | 7/2016 | Mathur et al. |
| 2016/0215994 A1 | 7/2016 | Mewes et al. |
| 2016/0223511 A1 | 8/2016 | Koshnick et al. |
| 2016/0232621 A1 | 8/2016 | Ethington et al. |
| 2016/0239709 A1 | 8/2016 | Shriver |
| 2016/0247075 A1 | 8/2016 | Mewes et al. |
| 2016/0247082 A1 | 8/2016 | Stehling et al. |
| 2016/0259089 A1 | 9/2016 | McKinnon et al. |
| 2016/0275580 A1 | 9/2016 | Uechi |
| 2016/0290918 A1 | 10/2016 | Xu et al. |
| 2016/0302351 A1 | 10/2016 | Schildroth et al. |
| 2016/0308954 A1 | 10/2016 | Wilbur et al. |
| 2017/0061052 A1 | 3/2017 | Gates et al. |
| 2017/0075034 A1 | 3/2017 | Kleeman et al. |
| 2017/0083747 A1 | 3/2017 | Guan et al. |
| 2017/0105335 A1 | 4/2017 | Xu et al. |
| 2017/0109395 A1 | 4/2017 | Farah |
| 2017/0124463 A1 | 5/2017 | Chen et al. |
| 2017/0161584 A1 | 6/2017 | Guan et al. |
| 2017/0161627 A1 | 6/2017 | Xu et al. |
| 2017/0168157 A1 | 6/2017 | Hagerman et al. |
| 2017/0169523 A1 | 6/2017 | Xu et al. |
| 2017/0196171 A1 | 7/2017 | Xu et al. |
| 2017/0213141 A1 | 7/2017 | Xu et al. |
| 2017/0228475 A1 | 8/2017 | Aldor-Noiman et al. |
| 2017/0261645 A1 | 9/2017 | Kleeman et al. |
| 2017/0270616 A1 | 9/2017 | Basso |
| 2017/0300602 A1 | 10/2017 | Leeds et al. |
| 2017/0316124 A1 | 11/2017 | Lee |
| 2017/0323426 A1 | 11/2017 | Johannesson |
| 2017/0329048 A1 | 11/2017 | Lemos et al. |
| 2017/0336533 A1 | 11/2017 | Alvarez et al. |
| 2017/0351005 A1 | 12/2017 | Alvarez et al. |
| 2017/0351790 A1 | 12/2017 | Farah et al. |
| 2017/0351963 A1 | 12/2017 | Leeds et al. |
| 2017/0357029 A1 | 12/2017 | Lakshmanan |
| 2018/0020622 A1 | 1/2018 | Richt |
| 2018/0024271 A1 | 1/2018 | Koch et al. |
| 2018/0035605 A1 | 2/2018 | Guan et al. |
| 2018/0042174 A1 | 2/2018 | Li et al. |
| 2018/0046735 A1 | 2/2018 | Xu et al. |
| 2018/0060975 A1 | 3/2018 | Hassanzadeh |
| 2018/0070527 A1 | 3/2018 | Richt |
| 2018/0075545 A1 | 3/2018 | Richt |
| 2018/0075546 A1 | 3/2018 | Richt |
| 2018/0108123 A1 | 4/2018 | Baurer et al. |
| 2018/0128933 A1 | 5/2018 | Koch et al. |
| 2018/0132422 A1 | 5/2018 | Hassanzadeh et al. |
| 2018/0146612 A1 | 5/2018 | Sauder et al. |
| 2018/0146624 A1 | 5/2018 | Chen et al. |
| 2018/0168094 A1 | 6/2018 | Koch et al. |
| 2018/0181893 A1 | 6/2018 | Basso |
| 2018/0211156 A1 | 7/2018 | Guan et al. |
| 2018/0260504 A1 | 9/2018 | Hu |

FOREIGN PATENT DOCUMENTS

| | | |
|---|---|---|
| WO | WO-2015/051339 A1 | 4/2015 |
| WO | WO-2018/081043 A1 | 5/2018 |

OTHER PUBLICATIONS

Chang, Young K., et al. "An automated yield monitoring system II for commercial wild blueberry double-head harvester." Computers and electronics in agriculture 81 (2012): 97-103.*

Benson, E. R., J. F. Reid, and Qinglin Zhang. "Machine vision—based guidance system for an agricultural small—grain harvester." Transactions of the ASAE 46.4 (2003): 1255.*

Dumont, B. et al. A Comparison of within-season yield prediction algorithms based on crop model behavior analysis. Agricultural and Forest Meteorology 204 (2015) p. 10-21.

Basso et al. Review of Crop Yield Forecasting Methods and Early Warning Systems. Michigan State University, 2013 (56 pages). Available at <http://www.fao.org/fileadmin/templates/ess/documents/meetings_and_workshops/GS_SAC_2013/Improving_methods_for_crops_estimates/Crop_Yield_Forecasting_Methods_and_Early_Warning_Systems_Lit_review.pdf>, last accessed Jan. 22, 2019.

Basso, B., et al., "A Strategic and Tactical Management Approach to Select Optimal N Fertilizer Rates for Wheat in a Spatially Variable Field," Europ. J. Agronomy, 35:215-22 (2011).

Basso, B., et al., "Analyzing the Effects of Climate Variability on Spatial Pattern of Yield in a Maize-Wheat-Soybean Rotation," Europ. J. Agronomy, 26:82-91 (2007).

Basso, B., et al., "Assessing the Impact of Management Strategies on Water Use Efficiency Using Soil-Plant-Atmosphere Models," Vadose Zone J., available from wvvvv.VadoseZone,Journal.org (2012).

Basso, B., et al., "Economic and Environmental Evaluation of Site-Specific Tillage in a Maize Crop in NE Italy," Europ. J. Agronomy, 35:83-92 (2011).

Basso, B., et al., "Environmental and Economic Evaluation of N Fertilizer Rates in a Maize Crop in Italy: A Spatial and Temporal Analysis Using Crop Models," Biosystems Engineering, 113:103-11 (2012).

Basso, B., et al., "Landscape Position and Precipitation Effects on Spatial Variability of Wheat Yield and Grain Protein in Southern Italy," J. Agronomy & Crop Science, 195:301-12 (2009).

Basso, B., et al., "Long-Term Wheat Response to Nitrogen in a Rainfed Mediterranean Environment: Field Data and Simulation Analysis," Europ. J. Agronomy, 33:132-38 (2010).

Basso, B., et al., "Spatial Validation of Crop Models for Precision Agriculture," Agricultural Systems, 68:97-112 (2001).

Batchelor, William D., et al., "Examples of Strategies to Analyze Spatial and Temporal Yield Variability Using Crop Models," Europ. J. Aoronomy, 18:141-58 (2002).

Broge, NH et al. Comparing prediction power and stability of broadband and hyperspectral vegetation indices for estimation of

(56) References Cited

OTHER PUBLICATIONS green leaf area index and canopy chlorophyll density. Remote sensing of environment. May 31, 2001. vol. 76(2), pp. 156-172.

Cammarano, D., et al., "Assessing the Robustness of Vegetation Indices to Estimate Wheat N In Mediterranean Environments," Remote Sens., 6:2827-44 (2014).

Cammarano, D., et al., "Use of the Canopy Chlorophyl Content Index (CCCI) for Remote Estimation of Wheat Nitrogen Content in Rainfed Environments," Agronomy Journal, 103(6):15971603 (2011).

Dumont et al. Parameter Identification of the STICS Crop Model, Using an Accelerated Formal MCMC Approach. Journal of Environmental Modeling and Software, vol. 52 (Feb. 2014), 42 pages.

Filimon E., "Weather to Buy or Sell Extreme Weather Impact on Corn Futures Market," Master's Thesis, pgs. 1-74 (2011).

Int'l Search Report and Written Opinion of the ISA/EP in PCT/US2017/043623; dated Sep. 4, 2017; 8 pgs.

Int'l Search Report and Written Opinion of the ISA/EP in PCT/US2017/050858 ; dated Dec. 8, 2017; 14 pgs.

Int'l Search Report and Written Opinion of the ISA/EP in PCT/US2017/050859; dated Nov. 22, 2017; 12 pgs.

Int'l Search Report and Written Opinion of the ISA/EP in PCT/US2017/050860; dated Dec. 19, 2017; 12 pgs.

Int'l Search Report and Written Opinion of the ISA/EP in PCT/US2019/014040; dated May 7, 2019; 14 pgs.

Int'l Search Report and Written Opinion of the ISA/US in PCT/US2017/57974; dated Feb. 13, 2018; 13 pgs.

International Application No. PCT/US2016031826; International Preliminary Report on Patentability, dated Nov. 14, 2017; 11 pages.

International Application No. PCT/US2016031826; International Search Report and Written Opinion, dated Aug. 18, 2018; 13 pages.

International Search Report and Written Opinion of the International Searching Authority in counterpart International Application No. PCT/US2015/063910, dated Feb. 5, 2016 (17 pages).

Jones, J.W., et al., "The DSSAT Cropping System Model," Europ. J. Agronomy, 18:235-65 (2003).

Nasir, MJ et al. Comparison of NOVI and supervised image classification to assess vegetative land cover in Ghazi Tehsil, District Haripur, Pakistan. Pakistan Journal of Plant Sciences. Jun. 30, 2012. vol. 18(1), pp. 73-84.

Ritchie, J.T., et al., "Water Use Efficiency is Not Constant When Crop Water Supply is Adequate or Fixed: The Role of Agronomic Management," Europ. J. Agronomy, 28:273-81 (2008).

Rosenzweig et al. The Agricultural Model Intercomparison and Improvement Project (AgMIP): Protocols and pilot studies. Journal of Agricultural and Forest Meteorology, vol. 170 (Mar. 15, 2013), pp. 166-182.

Sands, GR et al. A generalized environmental sustainability index for agricultural systems. Agriculture, Ecosystems & Environment. Jun. 30, 2000. vol. 79(1), pp. 29-41.

Tao, Fetal. Temporal and spatial changes of maize yield potentials and yield gaps in the past three decades in China. Agriculture, Ecosystems & Environment. Oct. 1, 2015. vol. 208, pp. 12-20.

Yield Editor 2.0, United States Department of Agriculture, Agricultural Research Service, Version 2.01 (Sep. 29, 2012), 28 pages.

* cited by examiner

CORRECTING AGRONOMIC DATA FROM MULTIPLE PASSES THROUGH A FARMABLE REGION

TECHNICAL FIELD

This disclosure is generally directed to techniques for improving the accuracy of agronomic data. Some embodiments relate particularly to improving the accuracy of characterizations of farmable regions, e.g., maps of crop yield or crop density.

BACKGROUND

Agronomy is the science and technology of producing and/or using plants (e.g., for food, fuel, fiber, ornamentation, land reclamation, etc.). Agronomy encompasses work in the areas of plant genetics, plant physiology, meteorology, soil science, etc. An agronomic simulator can be used to predict the agronomic output of a particular geographic region based on a set of agronomic inputs. The predictions output by an agronomic simulator may be limited by the accuracy of the input data provided to the agronomic simulator and the parameters used to configure the agronomic simulator.

SUMMARY OF THE INVENTION

Sensors can sometimes provide inaccurate measurements. For instance, errors can occur in data collection (for example, an erroneous value for an agronomic output, e.g., crop mass, can be collected) or in collection of related information (e.g., an erroneous value for the speed of a harvester can be measured). In addition, sensors can provide measurements that are accurate, but data processing tools can introduce errors into agronomic data derived from such measurements. For instance, such errors can be introduced when the analysis performed by data processing tools incorporates certain assumptions about the manner in which the sensors are operated, and the sensors are actually operated in a manner inconsistent with those assumptions.

The latter type of error sometimes occurs when a harvester traverses the same portion of a farmable region more than once during a harvest. During the harvester's second (or subsequent) pass over an already-harvested portion of the region, the harvester's sensors can accurately measure very low values for the yield of the already-harvested portion. However, data processing tools may incorporate an assumption that the harvester does not traverse the same portion of a farmable region more than once during a harvest, and may therefore calculate erroneously low yield values for the portions of the region traversed more than once by the harvester, based on the yield measurements obtained during second (or subsequent) passes over such portions of the region.

Left undetected, such errors can propagate into downstream analysis and can adversely affect decisions a farm agent makes based on the results of such analysis. In one example, erroneously low values for crop yield in a portion of a farmable region can lead a farm agent to believe that that portion of the farmable region is underperforming and warrants intervention that in reality may be superfluous or even deleterious. In another example, a portion of erroneously low values for crop yield in a farmable region may lead a farm agent to partition the farmable region such that that portion forms a border between partitions, thus depriving the partitions of valuable, productive land. In some cases, when data from multiple years are used, erroneous data can result in distorted data that indicates, e.g., an artificially low average crop yield.

Described herein are techniques for identifying inaccurate agronomic data arising from a harvester's traversal of the same portion of a farmable region more than once during a harvest. The inaccurate agronomic data can be corrected, thereby improving the accuracy of downstream analyses and characterizations of the farmable region, e.g., maps of crop yield or crop density.

According to an aspect of the present disclosure, the raw data collected by a harvester may be used to identify portions of a farmable region traversed by the harvester more than once during a harvest and to distinguish "first-pass" raw data collected during the harvester's first passes over such portions of the farmable region from "second-pass" raw data collected during the harvester's second or subsequent passes over such portions of the region. The first pass and/or second pass raw data can then be used to correct erroneously low values generated by downstream data analysis tools for the portions of the farmable region that the harvester traversed more than once. In some embodiments, the second-pass raw data is labeled as such or removed from the data set to prevent future contamination of downstream analyses. In some scenarios, the first pass and/or second pass raw data may not be available, but agronomic data corresponding to "sub-regions" (sets of portions) of the farmable region may be available. In the latter scenario, first-pass and/or second-pass data for parts of the farmable region traversed by the harvester more than once during a harvest may be estimated based on the sub-region agronomic data and the efficiency of the harvester.

In general, one innovative aspect of the subject matter described in this specification can be embodied in a method including: obtaining a plurality of agronomic data sets, wherein each of the agronomic data sets corresponds to a respective portion of a farmable region and includes (1) a value of an agronomic parameter of the portion of the farmable region, (2) spatial data indicating a location of the portion of the farmable region, and (3) temporal data indicating a time associated with measurement of the agronomic parameter value; obtaining, for at least one sub-region of the farmable region, agronomic data indicating an area of the sub-region and a value for the sub-region including (1) an aggregate value of the agronomic parameter for the sub-region determined based on the agronomic parameter values in a subset of the agronomic data sets corresponding to portions of the farmable region included in the sub-region and/or (2) a ratio of the aggregate value to the area of the sub-region; identifying, based on at least some of the spatial data of the agronomic data sets, at least one pair of the data sets corresponding to a pair of at least partially overlapping portions of the farmable region, the pair of data sets including a first data set not included in the subset of data sets corresponding to the sub-region and a second data set included in the subset; determining, based on the temporal data associated with the pair of data sets, which of the agronomic parameter values of the pair of data sets was measured earlier in time, and which of the agronomic parameter values of the pair of data sets was measured later in time; and in a case in which the agronomic parameter value of the second data set was measured later in time, determining an adjusted value for the sub-region based, at least in part, on the value of the agronomic parameter in the second data set, the value of the agronomic parameter in the first data set, an area of the portion of the farmable region corresponding to the second data set, and/or an extent to which the overlapping portions of the farmable region overlap.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, determining the adjusted value for the sub-region includes adding at least a part of the value of the agronomic parameter in the first data set to the aggregate value of the agronomic parameter for the sub-region, thereby obtaining an adjusted aggregate value of the agronomic parameter for the sub-region; and calculating a ratio of the adjusted aggregate value to the area of the sub-region, thereby obtaining the adjusted value. In some embodiments, adding at least a part of the value of the agronomic parameter in the first data set to the aggregate value includes determining a proportion of an area of the portion of the farmable region corresponding to the first data set that overlaps the sub-region; determining a product of the proportion and the value of agronomic parameter in the first data set; and adding the product to the aggregate value. In some embodiments, determining the adjusted value for the sub-region further includes: prior to obtaining the adjusted value for the sub-region, subtracting the value of the agronomic parameter in the second data set from the adjusted aggregate value of the agronomic parameter for the sub-region.

In some embodiments, determining the adjusted value for the sub-region includes subtracting an area of the portion of the farmable region corresponding to the second data set from the area of the sub-region, thereby obtaining an adjusted area of the sub-region; subtracting the value of the agronomic parameter in the second data set from the aggregate value of the agronomic parameter for the sub-region, thereby obtaining an adjusted aggregate value of the agronomic parameter for the sub-region; and calculating a ratio of the adjusted aggregate value to the adjusted area of the sub-region, thereby obtaining the adjusted value. The actions of the method may include adding a part of the area of the portion of the farmable region corresponding to the second data to an area of another sub-region, thereby obtaining an adjusted area of the other sub-region; adding the value of the agronomic parameter in the second data set to an aggregate value of the agronomic parameter for the other sub-region, thereby obtaining an adjusted aggregate value of the agronomic parameter for the other sub-region; and calculating an adjusted ratio of the adjusted aggregate value of the other sub-region to the adjusted area of the other sub-region. In some embodiments, the part of the area of the portion of the farmable region corresponding to the second data set is equal to a product of (1) a proportion of the area of the portion of the farmable region corresponding to the second data set that does not overlap the other sub-region, and (2) the area of the portion of the farmable region corresponding to the second data set. In some embodiments, the plurality of agronomic data sets is obtained from an agronomic database, and wherein the method further includes removing the second data set from the agronomic database.

In some embodiments, the agronomic parameter value of each of the agronomic data sets includes a crop mass value collected by a harvester. In some embodiments, the ratio of the aggregate value to the area of the sub-region includes a crop yield density value. In some embodiments, the spatial data of each of the agronomic data sets includes coordinates of the location of the corresponding portion of the farmable region. In some embodiments, the agronomic data sets are obtained from an agronomic database, and each of the agronomic data sets is indexed in the agronomic database based on the spatial data of the agronomic data set. The actions of the method may further include presenting a map of the farmable region, the map including a plurality of elements, wherein locations and areas of the elements correspond to locations and areas of respective portions of the farmable region represented by the plurality of agronomic data sets, and wherein a visual attribute of each element represents the agronomic parameter value of the corresponding portion of the farmable region. In some embodiments, the map further includes at least one tile, wherein a location of the tile corresponds to a location of the sub-region, an area of the tile corresponds to the area of the sub-region, and a visual attribute of the tile represents the aggregate agronomic parameter value for the sub-region or the ratio of the aggregate value to the area of the sub-region.

In general, another innovative aspect of the subject matter described in this specification can be embodied in a method including: for each sub-region in a plurality of sub-regions of a farmable region, obtaining respective agronomic data indicating an area of the sub-region and a value for the sub-region, wherein the value for the sub-region includes (1) an aggregate value of an agronomic parameter for the sub-region and/or (2) a ratio of the aggregate value to the area of the sub-region; identifying a part of a first sub-region that overlaps with a part of a second sub-region, wherein the first and second sub-regions are included in the plurality of sub-regions; determining whether the second sub-region is associated with a first pass by one or more sensors through the overlapping parts of the first and second sub-regions or a second pass by the sensors through the overlapping parts; and in a case in which the second sub-region is associated with the second pass, determining an adjusted value for the second sub-region based, at least in part, on the value for the first sub-region, the value for the second sub-region, the area of the first sub-region, the area of the second sub-region, and/or an area of the overlapping parts of the first and second sub-regions.

Other embodiments of this aspect include corresponding computer systems, apparatus, and computer programs recorded on one or more computer storage devices, each configured to perform the actions of the method. A system of one or more computers can be configured to perform particular actions by virtue of having software, firmware, hardware, or a combination of them installed on the system (e.g., instructions stored in one or more storage devices) that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. In some embodiments, the value for the first sub-region is derived from data collected by the sensors at a first time, wherein the value for the second sub-region is derived from data collected by the sensors at a second time, and wherein the value for the second sub-region is determined to be associated with the first pass if the second time is earlier than the first time. In some embodiments, the second sub-region is determined to be associated with the second pass if the second time is later than the first time.

In some embodiments, determining the adjusted value for the second sub-region includes determining a first-pass value for the overlapping parts of the first and second sub-regions, wherein the first-pass value for the overlapping parts includes (1) a first-pass aggregate value of the agronomic parameter for the overlapping parts and/or (2) a first-pass ratio of the first-pass aggregate value to the area of the overlapping parts. In some embodiments, the first-pass value for the overlapping parts is determined based, at least in part, on the area of the first sub-region, the area of the overlapping parts of the first and second sub-regions, and/or the value for the first sub-region. In some embodiments, determining the first-pass value includes estimating that the first-pass ratio is equal to the ratio for the first sub-region. In some embodiments, determining the first-pass value includes estimating that the first-pass aggregate value is equal to (1) a product of the area of the overlapping parts and the ratio for the first sub-region or (2) a product of (i) a ratio of the area of the overlapping parts to the area of the first sub-region and (ii) the aggregate value for the first sub-region.

The actions of the method may further include obtaining a plurality of agronomic data sets, wherein each of the agronomic data sets corresponds to a respective portion of the farmable region and includes (1) a value of the agronomic parameter for the portion of the farmable region and (2) spatial data indicating a location of the portion of the farmable region, and wherein a first subset of the agronomic data sets corresponds to portions of the farmable region included in the first sub-region. In some embodiments, the aggregate value of the agronomic parameter for the first sub-region is determined based on the agronomic parameter values in the first subset of agronomic data sets. In some embodiments, a first-pass subset of the agronomic data sets corresponds to one or more portions of the farmable region included in the first sub-region and in the overlapping parts of the first and second sub-regions, and the first-pass aggregate value of the agronomic parameter for the overlapping parts of the first and second sub-regions is determined based, at least in part, on the first-pass subset of agronomic data sets. In some embodiments, the first-pass aggregate value of the agronomic parameter for the overlapping parts of the first and second sub-regions is a sum of the values of the agronomic parameter for the data sets included in the first-pass subset.

In some embodiments, determining the adjusted value for the second sub-region further includes determining a second-pass value for the overlapping parts of the first and second sub-regions, wherein the second-pass value for the overlapping parts includes (1) a second-pass aggregate value of the agronomic parameter for the overlapping parts and/or (2) a second-pass ratio of the second-pass aggregate value to the area of the overlapping parts. In some embodiments, the second-pass value for the overlapping parts is determined based, at least in part, on an efficiency (E) of harvesting equipment used in the overlapping parts during the first pass and the second pass. In some embodiments, determining the second-pass value includes estimating the second-pass ratio as a product of (i) the first-pass ratio and (ii) $(1-E)/E$. In some embodiments, determining the second-pass value includes estimating the second-pass aggregate value as a product of the area of the overlapping parts and the second-pass ratio.

The actions of the method may further include obtaining a plurality of agronomic data sets, wherein each of the agronomic data sets corresponds to a respective portion of the farmable region and includes (1) a value of the agronomic parameter for the portion of the farmable region and (2) spatial data indicating a location of the portion of the farmable region, and wherein a second subset of the agronomic data sets corresponds to portions of the farmable region included in the second sub-region. In some embodiments, the aggregate value of the agronomic parameter for the second sub-region is determined based on the agronomic parameter values in the second subset of agronomic data sets. In some embodiments, a second-pass subset of the agronomic data sets corresponds to one or more portions of the farmable region included in the second sub-region and in the overlapping parts of the first and second sub-regions, and the second-pass aggregate value of the agronomic parameter for the overlapping parts of the first and second sub-regions is determined based, at least in part, on the second-pass subset of agronomic data sets. In some embodiments, the second-pass aggregate value of the agronomic parameter for the overlapping parts of the first and second sub-regions is a sum of the values of the agronomic parameter for the data sets included in the second-pass subset.

In some embodiments, determining the adjusted value for the second sub-region includes adding the first-pass aggregate value to the aggregate value for the second sub-region, thereby obtaining an adjusted aggregate value for the second sub-region; and calculating a ratio of the adjusted aggregate value for the second sub-region to the area of the second sub-region, thereby obtaining the adjusted value for the second sub-region. In some embodiments, determining the adjusted value for the second sub-region further includes prior to obtaining the adjusted value for the second sub-region, subtracting the second-pass aggregate value from the adjusted aggregate value for the second sub-region.

In some embodiments, determining the adjusted value for the second sub-region includes subtracting the area of the overlapping parts of the first and second sub-regions from the area of the second sub-region, thereby obtaining an adjusted area of the second sub-region; and calculating a ratio of the aggregate value for the second sub-region to the adjusted area of the second sub-region, thereby obtaining the adjusted value for the second sub-region. In some embodiments, determining the adjusted value for the second sub-region further includes prior to obtaining the adjusted value for the second sub-region, subtracting the second-pass aggregate value from the aggregate value for the second sub-region.

Particular embodiments of the subject matter described in this specification can be implemented so as to realize one or more of the following advantages. Inaccurate values of agronomic parameters of a farmable region can be identified and corrected, and the source of the inaccurate values can optionally be removed from data sets, thereby providing more accurate agronomic parameter values and agronomic data sets for downstream analysis. In some embodiments, more accurate representations (e.g., maps) of agronomic parameters of the farmable region can be generated using the corrected data.

Details of one or more embodiments of the subject matter of this disclosure are set forth in the accompanying drawings and the description below. Other features, aspects, and advantages of the subject matter will become apparent from the description, the drawings, and the claims.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

Certain advantages of some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Terms

Figure 1A:
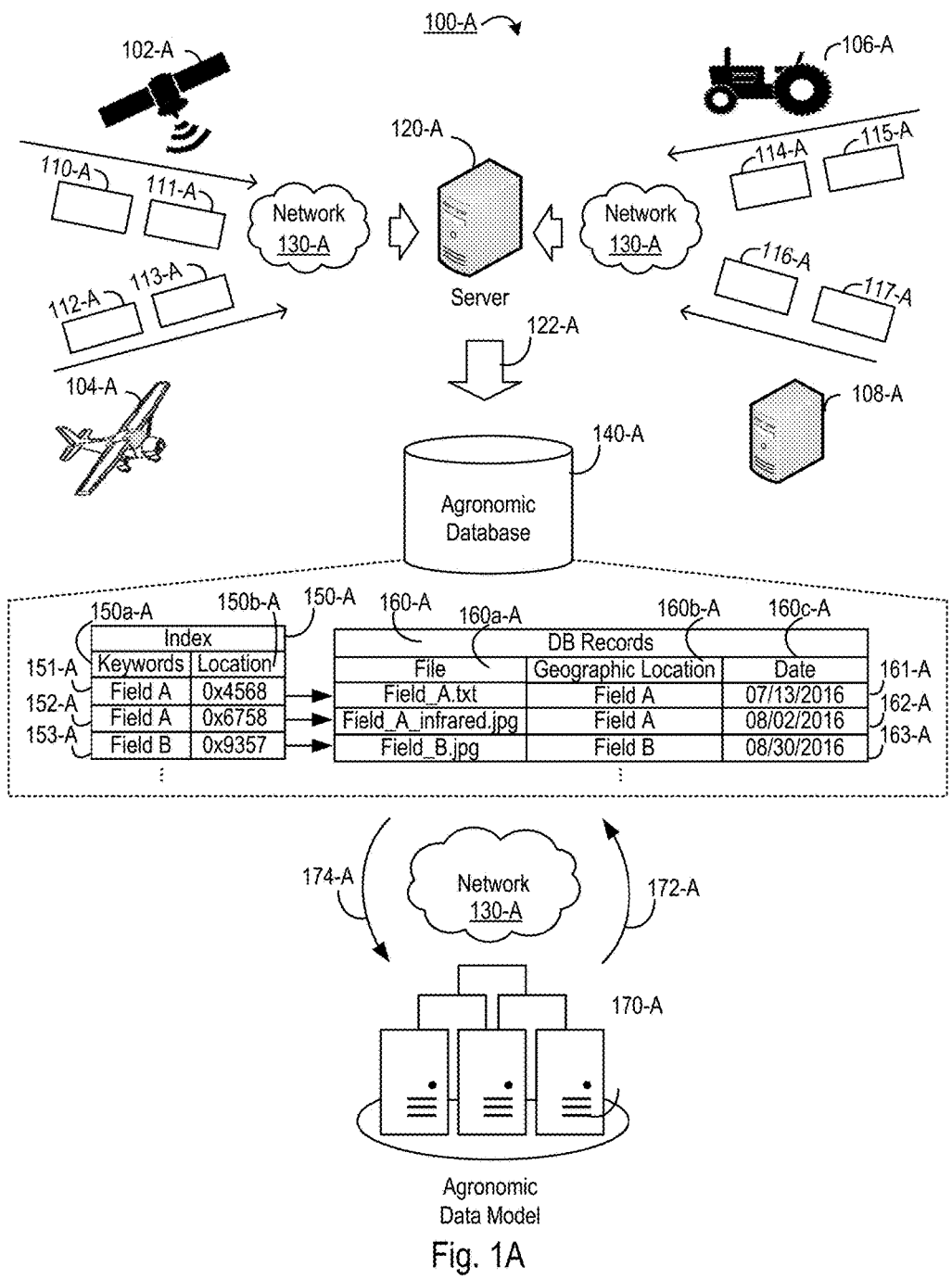
FIG. 1A is a diagram of an example of a system for obtaining agronomic data.

As used herein, "agronomic input" may refer to one or more attributes of a region (e.g., a geographic region, farmable region, farmable zone, etc.) related to the production and/or use of plants (e.g., for food, feed, fiber, fuel, ornamentation, environmental or climatic modification, etc.) in the region. Agronomic inputs may include, for example, agricultural and/or environmental characteristics of a region related to the production and/or use of plants in the region.

As used herein, "agricultural characteristics" may refer to cultivars present in a region, activities performed in the process of farming the region, other attributes of a region that can affect the production of plants in the region, and/or other interventions applied to the region that can affect the production of plants in the region. Agricultural characteristics can include both a type of agricultural characteristic (e.g., sandiness) and a value for the agricultural characteristic (e.g., 20%). In general, a "change in an agricultural characteristic" refers to a change in the value of the agricultural characteristic.

Agricultural characteristics may include, for example, biotic factors and non-biotic factors. As used herein, "biotic factors" may include, for example, one or more living components that have an influence on the agricultural characteristics of a particular portion (or all) of a geographic region. Alternatively, or in addition, "biotic factors" may include once-living components that have an influence on the agricultural characteristics of a particular portion (or all) of a geographic region. Some examples of biotic factors can include, but are not limited to: microbial presence, insect presence, weed presence, nematode presence, and fungal organism presence. As used herein, "non-biotic factors" may include, for example, "one or more non-living components that have an influence on the agricultural characteristics of a particular portion (or all) of a geographic region.

Some examples of agricultural characteristics can include, but are not limited to: maximum ponding height; soil conditions; planting date; planting window dates; temperate thresholds for planting; soil moisture thresholds for planting; crop row spacing; planting depth; crop species; crop variety/cultivar; yield components of the variety/cultivar (for example, beans per pod, pods per plant, kernels per ear, ears per plant, etc.); length of developmental stages of variety/cultivar; compression of developmental stages of variety/cultivar; planting density; field irrigation; irrigation event water volume; irrigation event dates; irrigation drain depth; irrigation drain spacing; fertilizer date; fertilizer amount; fertilizer type (for example, manure, anhydrous ammonia, etc.); chemical composition of fertilizer type; fertilizer application depth; fertilizer incorporation percentage; harvest date; percent of stalk/leaves knocked down at harvest; percent of plant by-product harvested (leaves, etc.); percent of grain/fiber/fruit/vegetable/etc. harvested; insect activity; plant hypoxia; weed growth; disease.

"Soil conditions" may include, but are not limited to, water table presence; location of water tables; topography (e.g., elevation); soil temperatures (e.g., including minimum and/or maximum); soil layer depth; saturated soil water content; soil bulk density; soil organic carbon content; soil clay content; soil sand content; soil silt content; soil stones (coarse fragment) content; lower limit of soil water availability; drained upper limit of soil water availability; saturated soil hydraulic conductivity; soil nitrogen content; soil pH; soil cation exchange capacity; soil calcium carbonate content; soil fresh organic matter (FOM) carbon, nitrogen and phosphorus content; soil active inorganic carbon content; soil slow inorganic carbon content; soil active inorganic phosphorus content; soil slow inorganic phosphorus content; and soil mineral nitrogen (e.g., including nitrate, ammonia and urea).

As used herein, "environmental characteristics" may refer to one or more climate conditions, weather conditions, and/or atmospheric conditions of a region. "Weather conditions" may include, but are not limited to, precipitation (e.g., rainfall, snowfall, hail, or other types of precipitation), storm intensity (e.g., tightness of precipitation in time, for example, 1" over 5 hours or in 5 minutes), humidity (e.g., relative humidity), wind, and solar radiation. "Atmospheric conditions" may include, but are not limited to, carbon dioxide levels, ozone levels, air temperatures (e.g., including minimum and/or maximum), and smog conditions.

As used herein, "ponding" may refer to a collection of water in a particular portion of a region.

As used herein, "agronomic output" may refer to one or more results of agronomic activity in a region (e.g., agronomic activity related to the region's agronomic inputs). An agronomic output can include both a type of agronomic output (e.g., crop yield) and a value for the agronomic output (e.g., 175 bushels/acre). In general, a "change in an agronomic output" refers to a change in the value of the agronomic output.

Some examples of agronomic outputs include, but are not limited to: crop yield; sustainability or environmental impact; length of developmental stages of variety/cultivar; yield; leaf area index (LAI) over time; damage/death to the crop by frost, anoxia, heat, drought, etc.; dry weight of grains/fiber/fruit/vegetables/etc.; dry weight of shoots/areal plant parts; root depth; total root dry weight; change in biomass from previous time slice; daily and/or accumulated thermal time; radiation use efficiency; relative thermal time to maturity; current plant development phase; root weight (e.g., per plant), tiller weight (e.g., per plant), and/or combined root and tiller weight (e.g., per plant); grain weight (e.g., per plant), tiller weight (e.g., per plant), and/or combined grain and tiller weight (e.g., per plant); total accumulated leaves or their equivalents; total accumulated phylochron intervals; leaf weight (e.g., per plant), tiller weight (e.g., per plant), and/or combined leaf and tiller weight (e.g., per plant); weight of stem reserves (e.g., per plant), tiller weight (e.g., per plant), and/or combined weight of stem reserves and tillers (e.g., per plant); weight of stems; sink weight; source weight; below ground active organic nitrogen, carbon, phosphorus, etc.; below ground active inorganic nitrogen, carbon, phosphorus, etc.; atmospheric $CO_2$; below ground fertilizer nitrogen, carbon, phosphorus, etc.; carbon in cumulative $CO_2$ evolved; cumulative nitrogen fixed; cumulative harvested plant nitrogen and/or phosphorus; total nitrogen, carbon, and/or phosphorus additions; below ground labile nitrogen and/or phosphorus; net nitrogen, carbon, and/or phosphorus change; total nitrogen, carbon, and/or phosphorus withdrawals; cumulative plant uptake of nitrogen and/or phosphorus; above ground rapid FOM nitrogen, carbon, and/or phosphorus; below ground rapid FOM nitrogen, carbon, and/or phosphorus; below ground resistant organic nitrogen, carbon, and/or phosphorus; above ground interim FOM carbon; below ground interim FOM carbon; above ground slow FOM nitrogen and/or carbon; below ground slow FOM nitrogen and/or carbon; below ground slow organic nitrogen and/or carbon; below ground slow inorganic nitrogen and/or carbon; below ground solution nitrogen and/or phosphate; recognizable standing dead nitrogen, carbon, and/or phosphorus; total nitrogen that can volatize; inorganic nitrogen in soil; cumulative nitrogen leached; organic nitrogen in soil; total nitrogen volatized; cold stress; drought; drought in stomatal conductivity; drought in turgidity; heat stress; nitrogen stress; phosphorus stress; photoperiod factor; cumulative drainage; potential cumulative evapotranspiration; potential evapotranspiration daily; cumulative plant transpiration; plant transpiration daily; cumulative soil evaporation; soil evaporation daily; cumulative evapotranspiration; evapotranspiration daily; cumulative irrigation; ponding height current; ponding height maximum; cumulative precipitation; cumulative runoff; potentially extractable water; and water table depth.

Agronomic inputs may be broken down by soil layer (e.g., by depth), over different time periods (for example, daily), and/or laterally (e.g., by location on a field). Lateral granularity can account for changes across a field or across multiple fields, such as changes in soil conditions, different crop/cultivar plantings in different locations on the same field, or other changes. For example, for every soil layer and for every time period agronomic outputs can also include, but are not limited to: new bulk density; downward water flux; net water flow; inorganic nitrogen in soil; root water uptake; dry weight of roots in the layer; soil temp; soil water content; soil hydraulic conductivity; upward water flux; active, slow, resistant organic carbon content's rapid, intermediate, and slow; total fresh organic matter content; soil carbon content; $CO_2$ sequestration; active, slow and resistant organic nitrogen contents; ammonia content; $N_2O$ content; nitrogen content; urea content.

As used herein, "agronomic parameters" may refer to one or more agronomic inputs and/or agronomic outputs of a region.

As used herein, "agronomic data" may refer to data indicating one or more values of one or more agronomic parameters and/or data otherwise characterizing agronomic parameters. As used herein, "agronomic input data" may refer to data indicating one or more values of one or more agronomic inputs and/or data otherwise characterizing agronomic inputs. As used herein, "agronomic output data" may refer to data indicating one or more values of one or more agronomic outputs and/or data otherwise characterizing agronomic outputs.

As used herein, "geographic region" may refer to a portion of the surface of the earth. Alternatively, or in addition, "geographic region" may refer to a portion of the surface of any planet, asteroid, or other celestial body. Alternatively, or in addition, "geographic region" may refer to a portion of the surface of an indoor greenhouse.

As used herein, "farmable region" may refer to an area for which agronomic inputs can be determined, for which agronomic outputs can be predicted or simulated, and/or for which historical evaluation or diagnosis of agronomic inputs, outputs, or both can be performed. An historical diagnosis can be useful, e.g., when actual values for agronomic inputs and outputs are known and the root cause of the actual values for the agronomic outputs is determined (e.g., 10% more rain than normal was a direct cause of the observed crop yield), or to determine the value of an intermediate agronomic input or output (which may be unobservable).

As used herein, "agronomic simulator" may refer to a system that estimates and/or predicts agronomic output based on agronomic input data. An agronomic simulator may simulate agronomic activity based on provided agronomic input data.

Agronomic activity can be simulated using an agronomic model, such as the SYSTEM APPROACH TO LAND USE SUSTAINABILITY (SALUS) model or the CERES model. The SALUS model may model crop, soil, water, atmospheric, and nutrient conditions (e.g., continuous crop, soil, water, atmospheric, and nutrient conditions) under different management strategies for multiple years. These strategies may have various crop rotations, planting dates, plant populations, irrigation and fertilizer applications, and tillage regimes. The model may simulate plant growth and soil conditions every day (during growing seasons and fallow periods) for any time period when weather sequences are available or assumed. The model can account for farming and management practices such as tillage and residues, water balance, soil organic matter, nitrogen and phosphorous dynamics, heat balance, plant growth, plant development, presence of biotech traits, application of fungicides, application of pesticides, application of antimicrobials, application of nucleic acids, and application of biologicals. The water balance can consider surface runoff, infiltration, surface evaporation, saturated and unsaturated soil water flow, drainage, root water uptake, soil evaporation and transpiration. The soil organic matter and nutrient model can simulate organic matter decomposition, nitrogen mineralization and formation of ammonium and nitrate, nitrogen immobilization, gaseous nitrogen losses, and three pools of phosphorous.

The agronomic simulator may use any process or model that can predict agronomic outputs based on provided agronomic input data. For instance, the agronomic simulator can use a physical, generative or mechanistic model; a purely statistical or machine learning model; or a hybrid. In an example, the agronomic simulator can use a model that predicts agronomic outputs by attempting to match (by exact match or approximate match using, for instance, nearest neighbor) the provided agronomic input data, or a transformation or function thereof (for example, a dimensionality reduction, such as Principle Components Analysis or the outputs of an Indian Buffet Process or other latent factor model), with previously observed input data, and predicting that the outputs for the provided agronomic input data will match the previously observed outputs corresponding to the matching, previously observed input data.

In some examples, an agronomic simulator can use one or more non-analytic functions. An analytic function that can be locally represented by a convergent power series; a non-analytic function cannot be locally represented by a convergent power series.

Further description of some embodiments of an agronomic simulator is provided in U.S. patent application Ser. No. 15/259,030, titled "Agronomic Database and Data Model" and filed on Sep. 7, 2016, the contents of which are hereby incorporated by reference herein to maximum extent permitted by applicable law.

As used herein, a "farm agent" may include an entity, for example a person or corporation, with responsibility for agricultural operations in a farmable region.

Some Techniques for Obtaining Agronomic Data

FIG. 1A is a diagram of an example of a system 100-A for obtaining agronomic data. The system 100-A may include one or more vehicles (e.g., a satellite 102-A, an airplane 104-A, or a tractor 106-A), at least one agronomic data providing server 108-A, a server 120-A, an agronomic database 140-A, and an agronomic data model 170-A.

Each of the vehicles may be equipped with one or more sensors capable of collecting agronomic data associated with a particular geographic region (e.g., a field of a farm). In some instances, the vehicles may include, for example, a satellite 102-A or an airplane 104-A equipped with one or more remote sensing devices for capturing image(s) of at least a portion of a geographic location. The images may include, for example, red-blue-green images, thermal images, infrared images, radar images, etc. Alternatively, or in addition, the vehicles may include a tractor 106-A equipped with one or more sensors capable of collecting agronomic data related to a particular portion of a geographic location that includes, for example, a plant's location (e.g., GPS location), the plant's weight, the plant's time of harvest, etc. Other types of vehicles may also be used to collect agronomic data associated with a particular portion of a geographic location. Such vehicles may include, for example, a drone. The agronomic data 110-A, 111-A, 112-A, 113-A, 114-A, and 115-A captured by the vehicles may be transmitted via a network 130-A to a server 120-A. The network 130-A may include one or multiple networks, for example, a LAN, a WAN, a cellular network, the Internet, etc.

Alternatively, or in addition, agronomic data 116-A and 117A may be obtained from one or more agronomic data providing servers 108-A. The server 108-A may, for example, house a database of historic agronomic data items from one or more geographic locations. For instance, the server 108-A may provide access to a database (e.g., a database hosted by a government agency, university, etc.) that tracks changes in agronomic data associated with particular geographic locations over time. The agronomic data 116-A, 117-A may be obtained from the server 108-A via a network 130-A.

Server 120-A may process the data 110-A, 111-A, 112-A, 113-A, 114-A, 115-A, 116-A, 117-A received via network 130-A and store 122-A the received data in an agronomic database 140-A. Processing the received data 110-A-117-A by server 120-A may include extracting relevant aspects of the received data for storage. Alternatively, or in addition, processing of the received data 110-A-117-A by server 120-A may include generating an index 150-A that can be used to efficiently access and retrieve the data 110-A-117-A once the data 110-A-117-A are stored as records 160-A in the agronomic database 140-A. The agronomic database 140-A may be hosted on the server 120-A. Alternatively, or in addition, the agronomic database may be hosted by one or more other servers.

The index 150-A may include one or more fields for each index entry 151-A, 152-A, 153-A, etc. Examples of index fields may include, for example, a keyword field 150a-A, a storage location field 150b-A, etc. In the example of system 100-A, the agronomic database 140-A may be configured to receive one or more search parameters for one or more database records (for example, search parameters requesting data related to "Field A"). In response to the receipt of such search parameters, the agronomic database 140-A may identify all the index entries matching the search parameter, identify the storage location 150b-A associated with each matching index entry, and access the database record stored at the identified storage locations. Though a particular example of an index 150-A and index fields 150a-A, 150b-B are provided herein, the present disclosure need not be so limited. Instead, any type of index may be used to index the data 110-A-117-A received and stored in the agronomic database 140-A so long as the data stored in the agronomic database 140-A can be accessed by the agronomic data model 170-A.

The data 110-A-117-A may be stored in the agronomic database 140-A as one or more database records 160-A. The agronomic database 140-A may store records in any logical database form (for example, a relational database, hierarchical database, column database, etc.). Instead of requiring the use of a particular logical database schema, the agronomic database 140-A may only require a configuration that allows the agronomic data stored by the agronomic database 140-A to be accessed by the agronomic data model 170-A. Some examples of the types of data that may be stored in agronomic database 140-A include a file 160a-A (e.g., an image file), a geographic location 160b-A associated with the stored file (or other agronomic data), a date 160c-A the data were captured, or the like. Any suitable type of data may be stored, and in some embodiments the types of data stored are determined based on the type of received data 110-A-117-A.

One or more server computers may provide access to the agronomic data model 170-A. The agronomic data model 170-A may request 172-A data from the agronomic database 140-A via a network 130-A. The requested data may be data that can be used to analyze agronomic inputs associated with a particular geographic location. Agronomic data responsive to the agronomic data model's 170-A request 172-A may be returned 174-A from the agronomic database 140-A to the agronomic data model 170-A via one or more networks 130-A. The agronomic data model 170-A may use the agronomic data returned 174-A from the agronomic database 140-A as an agronomic input to the model.

Figure 1B:
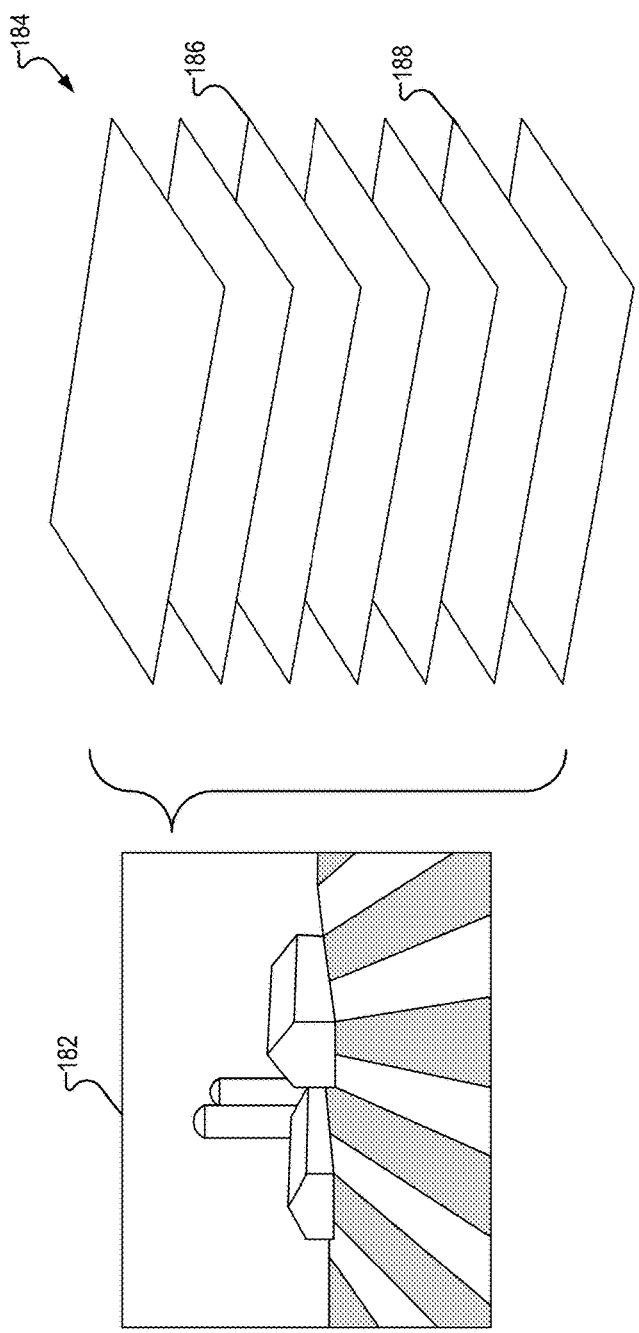
FIG. 1B is a diagram of some agronomic parameters of a farmable region.

FIG. 1B illustrates components that describe some agronomic parameters of a farmable region 182. The farmable region can be a traditional field or a controlled (e.g., partially controlled) environment, for example, a greenhouse, a glass house, a shade house, a growth chamber, etc.

The agronomic output of the farmable region 182 can be influenced by one or more agronomic inputs. For example, crop yield (e.g., an amount of crops produced) in the farmable region 182 can be affected by one or more of rainfall, soil depth, nitrate levels, plant population, and/or other agronomic inputs. Each of these agronomic inputs can be considered as a separate variable or layer of a model of the farmable region 182. For instance, the farmable region 182 can be described by multiple layers 184, including, for example, a nitrogen layer 186, a rainfall layer 188, and/or other layers.

Figure 2:
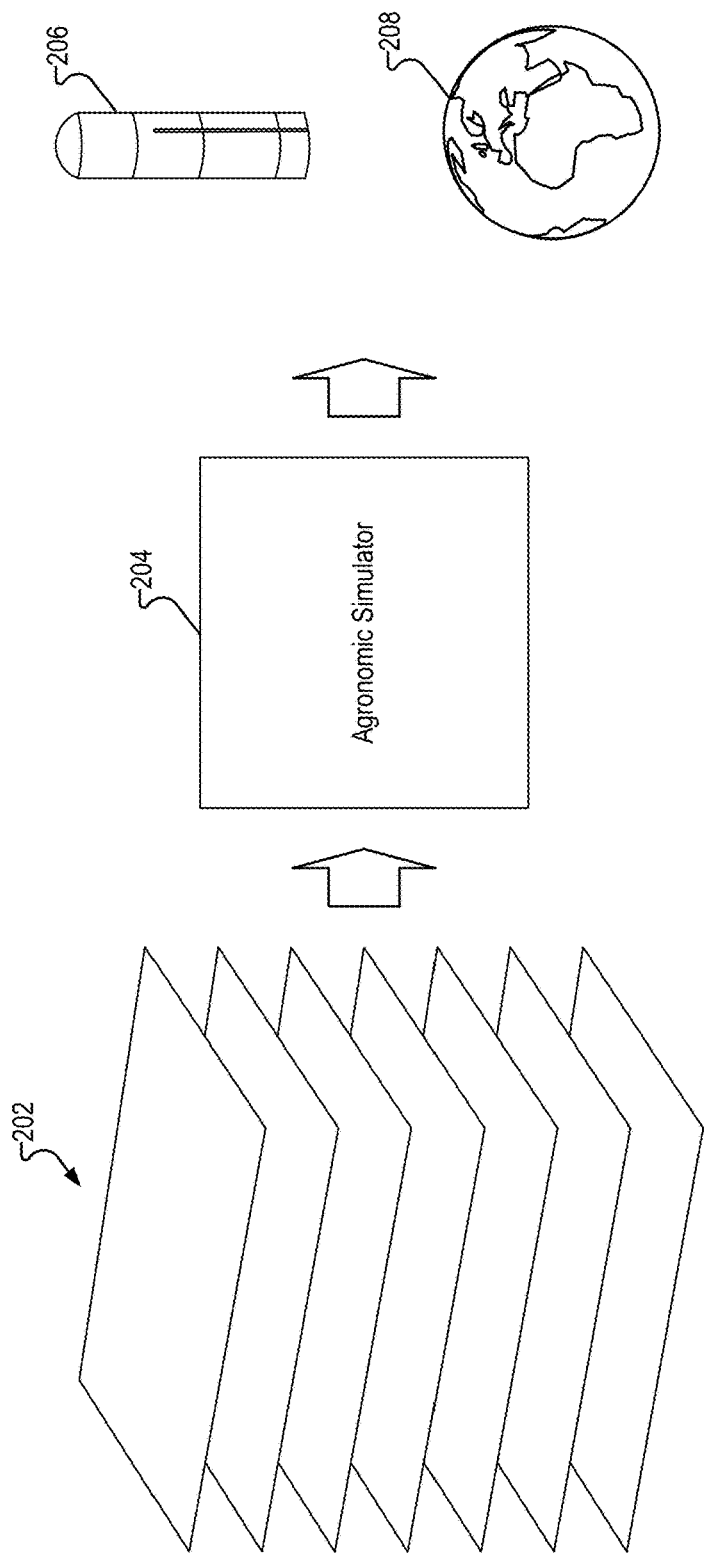
FIG. 2 is a diagram of an example of an agronomic simulator.

In some examples, the techniques described here for identifying and removing inaccurate agronomic data can be used in conjunction with an agronomic simulator to predict or understand the behavior of a farmable region. FIG. 2 illustrates providing agronomic input data 202 to an agronomic simulator 204 to determine values of one or more agronomic outputs (e.g., crop yield 206, sustainability or environmental impact 208, or other agronomic outputs).

In general, if plant growth is different across a farmable region, the differences can be attributed to differences in one or more of the agronomic inputs of the farmable region. Accordingly, plants can be used as biological sensors that indicate agronomic inputs. Farm or remote sensing equipment can be equipped with location sensing devices, such as global positioning system (GPS) devices, allowing the location of individual plants or groups of plants to be determined.

Figure 3:
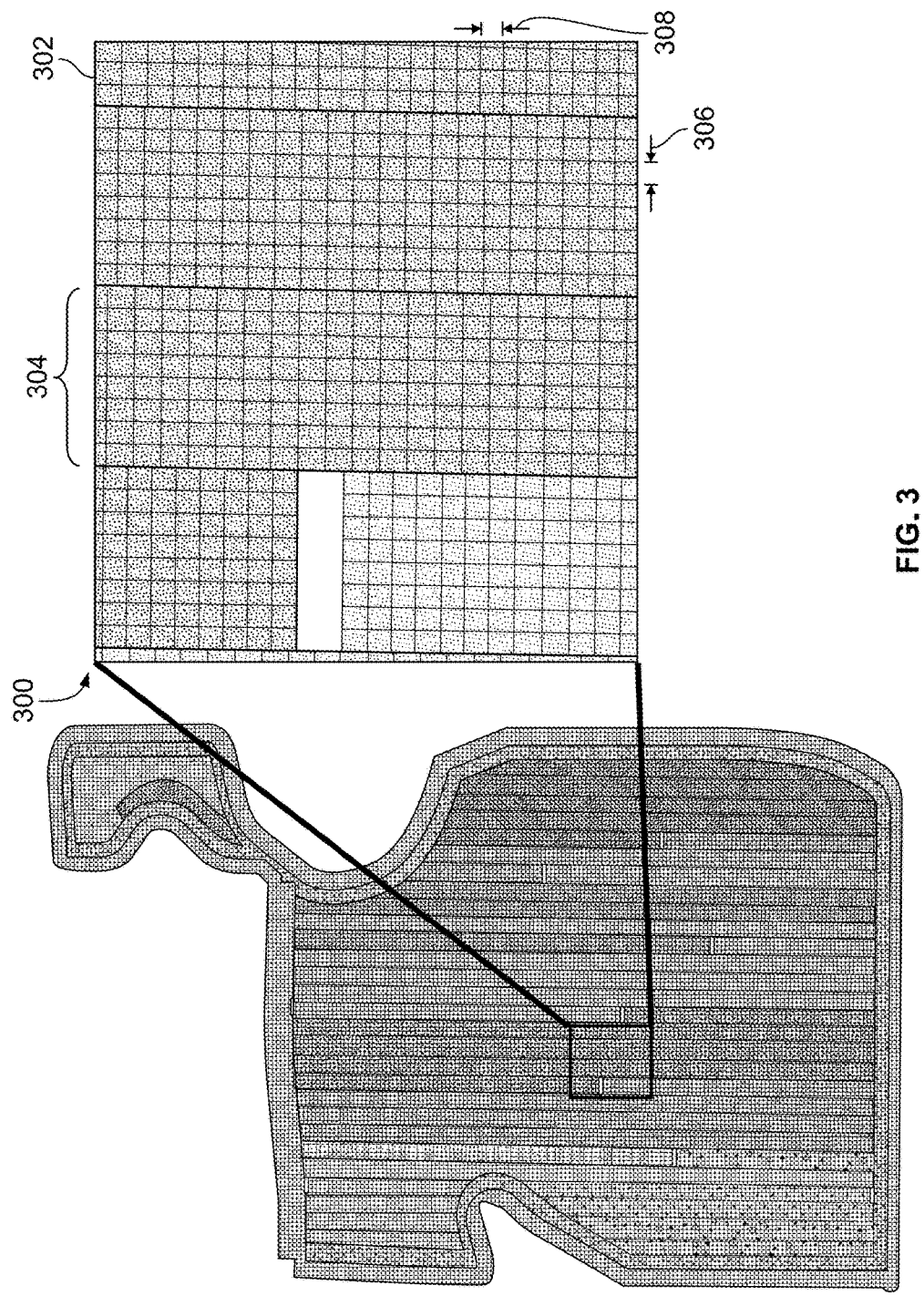
FIG. 3 is an example of a map of a farmable region.

Some Techniques for Detecting and Adjusting Inaccurate Agronomic Parameter Values As noted above, farm machinery can be equipped with sensors that can collect data indicative of values of an agronomic parameter of a farmable region. Referring to FIG. 3, farm machinery (e.g., a harvester) often moves through a farmable region in a regular pattern of rows or columns, collecting values of agronomic parameters (or data from which such values can be derived) as it moves through the region. The agronomic parameter values can be represented as a map 300 of the farmable region in which each map element 302 indicates a single value or group of values of an agronomic parameter (e.g., crop mass) for a portion of the farmable region represented by that element 302. In the example of FIG. 3, each element 302 has a width 306 that corresponds to the width of the farm machinery, such that each column of the map 300 corresponds to a single pass of the farm machinery through the farmable region. In the example of FIG. 3, each element 302 also has a length 308 that corresponds to the distance traveled by the farm machinery between collection of the agronomic parameter value for the portion of the farmable region represented by that element and the agronomic parameter value for the portion of the farmable region represented by the next element in the column.

In some examples, multiple elements 302 are grouped together into collections referred to as "tiles" 304. The portions of the farmable region represented by the elements 302 of a tile 304 may be collectively referred to as a "sub-region" of the farmable region. In the example of FIG. 3, each tile 304 is eight elements wide. Other tile sizes are possible. For example, the width of a tile may be 2, 3, 4, 5, 7, 10, 12, 15, 20, or any other suitable number of elements 302. Based on (1) the dimensions of each of the constituent portions of the sub-region represented by the elements in a tile, and (2) the agronomic parameter values for the elements in the tile, agronomic parameter values can be calculated for each tile. For example, the crop density of a tile may be determined based on the crop mass values and the areas associated with the tile's elements (e.g., tile crop density=sum(element crop mass)/sum(element area) for all elements of the tile).

Figure 4:
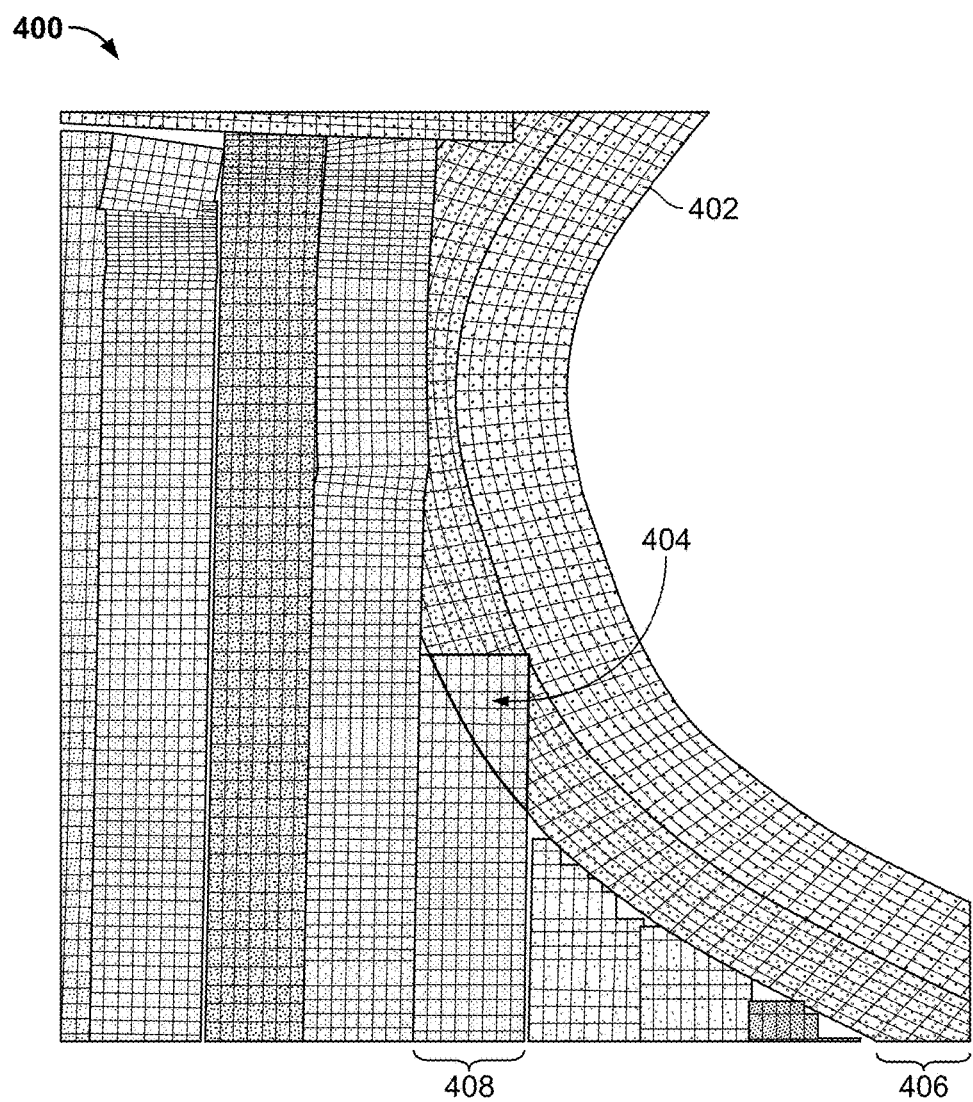
FIG. 4 is another example of a map of a farmable region.

Referring to FIG. 4, a farmable region is often not regularly shaped. For instance, in the example of FIG. 4, one side 402 of a farmable region represented by a map 400 is curved. When farm machinery moves through an irregularly shaped farmable region, the farm machinery may pass over portions of the farmable region more than once, and may therefore collect data from those portions more than once. In the example of FIG. 4, the map 400 indicates that a sub-region 404 of the farmable region was passed over a first time by farm machinery (e.g., a harvester) moving along a curved trajectory corresponding to a tile 406, and a second (subsequent) time by a harvester moving along a rectangular trajectory corresponding to a tile 408.

The second time the harvester passes over the sub-region 404, the harvester may harvest little or no crop, because the sub-region 404 has already been harvested once. The crop mass detected by a yield monitor in the harvester during the second pass over the sub-region 404 may therefore be lower (e.g., much lower) than the crop mass detected during the first pass over the sub-region 404. In some cases, the crop mass detected during the second pass may be negligible. However, a data processing tool that aggregates the map elements into the tile 408 may operate under the assumption that all crop mass values detected during the harvesting of the tile 408 are first-pass values of the crop mass. Thus, using the low, second-pass values for the crop masses of the portions of the region corresponding to the elements of the map in the sub-region 404, the data processing tool may calculate a crop yield density value for the tile 408 that is lower than the actual crop density of the sub-region corresponding to the tile 408.

Absent detection and correction, the inaccurate crop yield density value may persist in an agronomic database and/or be propagated into downstream data analyses, and thus a farm agent making use of such data or analyses may make decisions based on inaccurate information. For instance, if the average crop yield density for the tile 408 appears artificially low, the farm agent may initiate unnecessary or even counter-productive interventions. Alternatively, the lower crop yield density from the tile 408 may be flagged as an outlier value and all the data for the tile 408 may be discarded, thereby eliminating the inaccurate crop yield density value but also depriving the farm agent of any accurate data regarding performance of the sub-region corresponding to the tile 408. Neither of these approaches is satisfactory.

The present disclosure describes techniques for detecting and adjusting inaccurate agronomic parameter values. Using these techniques, the problems associated with artificially skewing average data and the problems associated with discarding accurate data may be avoided or substantially reduced. For example, the data sets collected by a harvester for the portions of the farmable region corresponding to the map elements may be used to identify portions of the farmable region traversed by the harvester more than once during a harvest, and to distinguish "first-pass" data sets collected during the harvester's first passes over such portions of the farmable region from "second-pass" data sets collected during the harvester's second or subsequent passes over such portions of the region. The first pass and/or second pass data sets can then be used to correct erroneously low values generated by downstream data analysis tools for the portions of the farmable region that the harvester traversed more than once. In some embodiments, the second-pass data set is labeled as such or removed from an agronomic database to prevent future contamination of downstream analyses.

For example, the values for each data set collected by a harvester during a harvest of a farmable region may be stored in an agronomic database. Each of these data sets may include data collected by the harvester for a corresponding portion of the farmable region (e.g., one or more agronomic parameter values measured or calculated by the harvester for the portion of the region, spatial data indicating a location of the portion, and temporal data indicating a time associated with the harvester's measurement or calculation of the agronomic parameter values). The data sets may be indexed in the agronomic database based on the spatial data (e.g., based on spatial coordinate values, for example, latitude and longitude). Pairs of data sets corresponding to overlapping portions of the region may be identified based on their spatial coordinates. The identified data sets may be retrieved from the agronomic database and the temporal data associated with the data sets may be compared. The data set associated with the later measurement time may be identified as a second-pass data set (e.g., a data set that contains at least some data associated with a harvester's second or subsequent pass over an area of the farmable region), and the other data set may be identified as a first-pass data set (e.g., a data set that contains no data associated with a harvester's second pass over an area of the farmable region). The pair of data sets may be used to adjust an inaccurate agronomic parameter value associated with a tile derived from the second-pass data set.

As just example, the second-pass data set may be removed from the agronomic database, and the area of the second-pass tile (e.g., the tile derived from the second-pass data set) may be adjusted (e.g., reduced) to reflect that that second-pass tile no longer includes the area of the portion of the farmable region corresponding to the discarded second-pass data set. The agronomic parameter value (e.g., the yield density) of the second-pass tile can then be recalculated based on the adjusted area of the tile and the remaining data sets corresponding to the tile.

In some examples, farm machinery is not perfectly efficient. For instance, a harvester may not necessarily harvest all the crop in a portion of a farmable region during its first pass through the portion. On a second pass through that same portion of the farmable region, a smaller but non-zero crop mass may be harvested. The above-described technique (e.g., discarding the second-pass data set and adjusting the second-pass tile area to exclude the area of the portion of the farmable region corresponding to the second-pass data set) can be modified to account for a non-zero second-pass harvest, for example, by adjusting the total crop mass for the second-pass tile to exclude the non-zero crop mass harvested during the second pass through the portion of the farmable region corresponding to the second-pass data set. For instance, the crop mass of the discarded second-pass data set can be excluded from (e.g., subtracted from) the total crop mass for the tile.

In some examples, the total areas $A_{TJ}$ and $A_{TK}$ and total crop masses $M_{TJ}$ and $M_{TK}$ for two partially overlapping tiles $T_J$ and $T_K$ may be known (e.g., stored in an agronomic database), but the crop masses for the individual elements of the tiles may not be known. In such cases, the crop mass harvested during the second pass through a sub-region R in which the tiles overlap can be estimated based on the efficiency E of the harvester, the area $A_R$ of that overlapping sub-region, the total area $A_{TJ}$ of the tile $T_J$ corresponding to the first pass through the sub-region R, and the total crop mass $M_{TJ}$ of tile T. In some examples, the efficiency E of the harvester can be determined by deliberately harvesting the same sub-region twice. For example, if a crop mass $M_1$ is harvested during the first pass through the sub-region and a crop mass $M_2$ is harvested during a second pass through the sub-region R, the efficiency E of the harvester may be $E=M_1/(M_1+M_2)$. Any suitable technique for determining the area $A_R$ of the sub-region R in which the tiles overlap may be used, including but not limited to the techniques described herein. Given $A_{TJ}$ (the area of tile $T_J$), $M_{TJ}$ (the total crop mass for the tile $T_J$), E (the efficiency of the harvester), and $A_R$ (the area of the region R in which the tiles $T_J$ and $T_K$ overlap), the crop mass $M_{R2}$ harvested during the second pass through the overlapping sub-region can be estimated as $M_{R2}=(A_R/A_{TJ})*M_{TJ}*(1-E)/E$. (In the foregoing expression, $(A_R/A_{TJ})*M_{TJ}$ represents an estimate of the portion $M_{R1}$ of the total mass $M_{TJ}$ of the tile $T_J$ that was harvested during the first pass through the overlapping region R, and $(1-E)/E$ represents the ratio between the crop mass harvested in the second pass through a sub-region and the crop mass harvested in the first pass through a sub-region for a harvester of efficiency E.) As described above, the total crop mass $M_{TK}$ of the second-pass tile $T_K$ corresponding to the second pass through the sub-region R can be adjusted to account for a non-zero second-pass harvest in the sub-region R, for example, by adjusting the total crop mass $M_{TK}$ for the second-pass tile $T_K$ to exclude (e.g., subtract) the crop mass $M_{R2}$ harvested during the second pass through the sub-region R.

Figure 5:
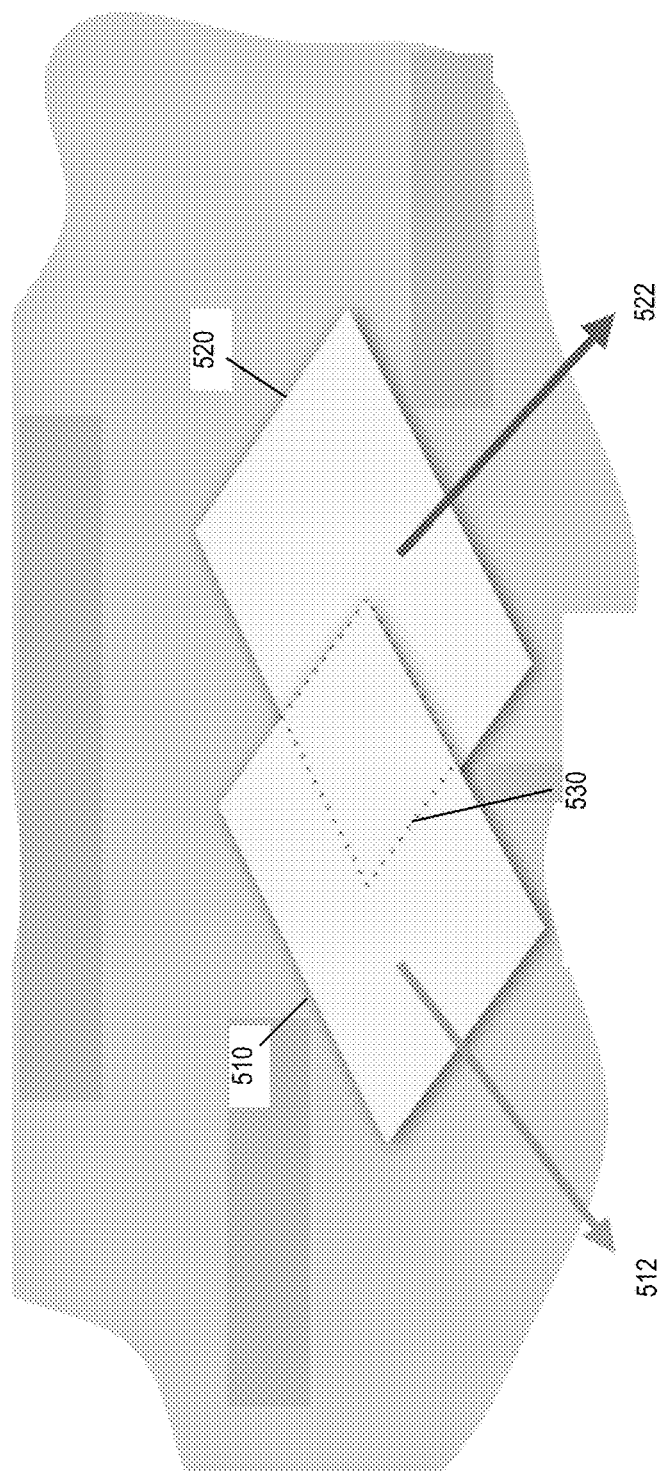
FIG. 5 is an illustration of an example of overlapping tiles within a farmable region.

Referring to FIG. 5, in a specific example, a map of a farmable region includes two tiles (510, 520), each of which includes multiple map elements. The tiles (510, 520) partially overlap in an overlap region 530. As a harvester harvests grain from the farmable region, the harvester first passes over the farmable sub-region represented by the tile 510. The harvester subsequently passes over the farmable sub-region represented by the tile 520. However, the farmable sub-region represented by the tiles' overlap region 530 has already been harvested, and thus a yield monitor on the harvester measures little or no crop mass harvested in the overlap region 530.

Continuing the example of FIG. 5, the farmable region is known to have a substantially uniform crop yield density of 200 bushels per acre. The crop yield density for each tile may be calculated as the ratio of (1) the total crop mass harvested during the harvester's traversal of the farmable sub-region represented by that tile, to (2) the area of the sub-region represented by the tile. The calculated crop yield density (512) for the tile 510 may be 200 bushels per acre. However, the calculated crop yield density (522) for the tile 520 may be only 150 bushels per acre, because little or no crop mass is harvested in the overlap region 530 during the harvester's traversal of the portions of the farmable region represented by the tile 520.

To account for the overlap region 530, the data sets corresponding to the elements in tile 520 that occupy the overlap region 530 may be identified as second-pass elements (e.g., elements corresponding to second-pass data sets) and discarded. The area of the tile 520 may be adjusted (e.g., reduced) such that the tile's area does not include the area of the overlap region 530. In the example of FIG. 5, the overlap region occupies 25% of the total area of the tile 520, and thus the adjusted area of the tile 520 may be 75% of the original, unadjusted area. The total crop mass for the adjusted tile 520 may be substantially the same as the total crop mass for the unadjusted tile 520. However, if the adjusted area of tile 520 is 75% (¾) of its previous value, the calculated crop yield density is higher than the crop yield density calculated without this adjustment. Indeed, by discarding the second-pass elements in the overlap region 530 and adjusting the area of the tile 520 accordingly, the crop yield density for the adjusted tile 520 may be recalculated as 150/(¾)=200 bushels per acre.

Figure 6A:
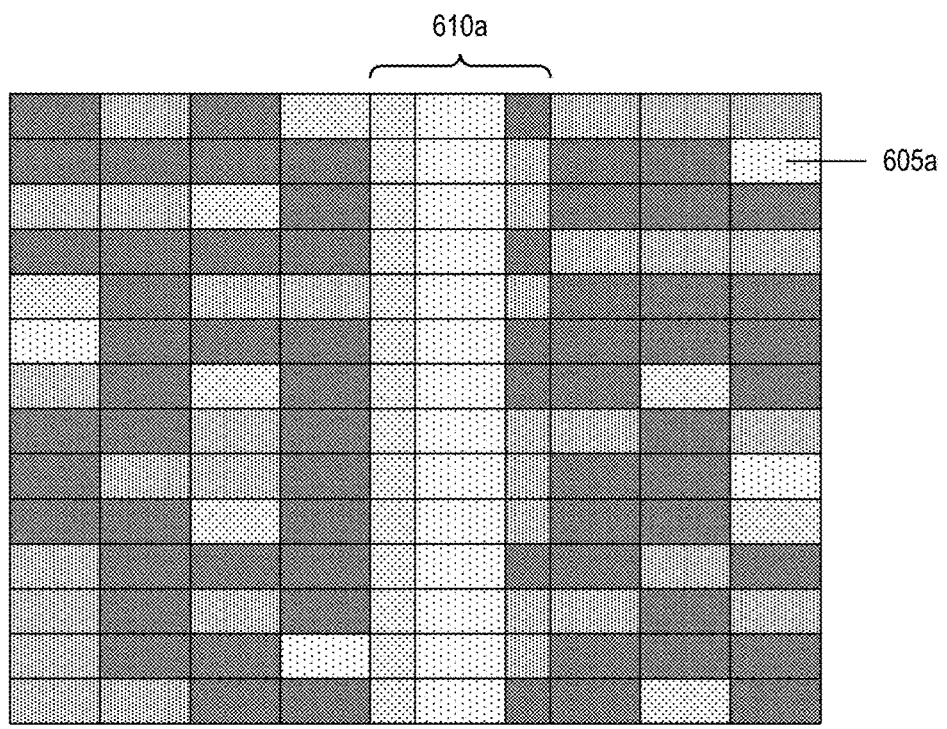
FIG. 6A is an example of a map that shows inaccurate data for a farmable sub-region that was traversed more than once by a harvester during a harvest.
Figure 6B:
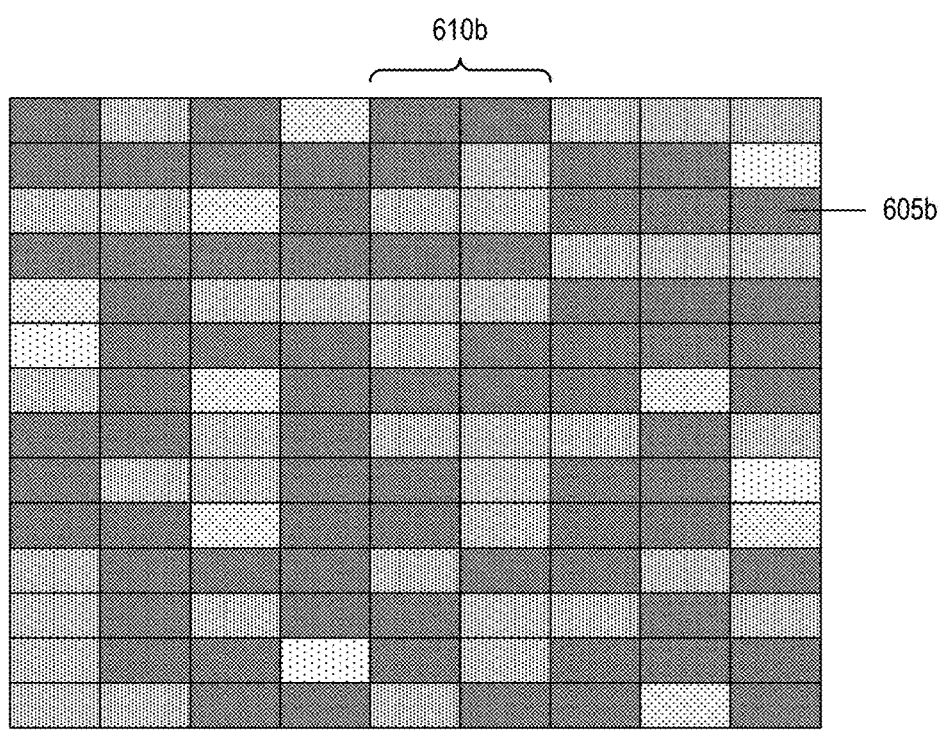
FIG. 6B is an example of the map of FIG. 6A after correcting the inaccurate data for the sub-region that was traversed more than once by the harvester during the harvest.

FIGS. 6A and 6B show yield maps for a farmable region. In the example of FIGS. 6A and 6B, the crop yield density of each tile 605 is represented by the density of the tile's fill pattern, with lower fill density (e.g., in tile 605a) representing lower yield density and higher fill density (e.g., in tile 605b) representing higher yield density. Referring to FIG. 6A, in a specific example, a yield map for a farmable region in which adjustments for second-pass data have not been applied shows a set of tiles 610a with significantly lower crop yield density than the surrounding tiles. A strip of the farmable region in the center of the set of tiles 610a appears to have been traversed more than once by a harvester. Referring to FIG. 6B, a yield map for the same farmable region after applying adjustments for second-pass data shows a generally more uniform yield across the farmable region, and more accurate yield density for the set of tiles 610b.

Figure 7A:
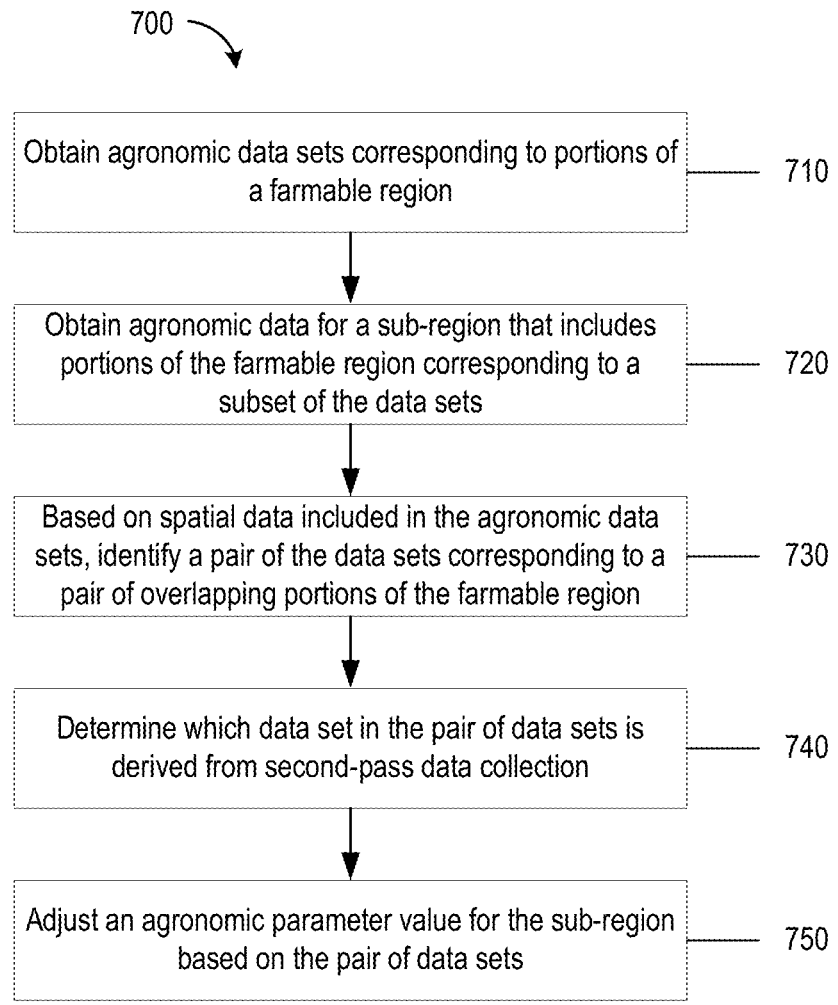
FIG. 7A is a flow chart of a method for adjusting an agronomic value associated with a farmable sub-region.

Referring to FIG. 7A, a method 700 for adjusting an agronomic value associated with a farmable sub-region may include steps 710-750. In step 710, agronomic data sets corresponding to portions of a farmable region are obtained. In step 720, agronomic data for a sub-region SR1 of the farmable region are obtained. The sub-region SR1 includes portions of the farmable region corresponding to a subset of the agronomic data sets obtained in step 710. The agronomic data for the sub-region SR1 may indicate a ratio between (1) an aggregate value of an agronomic parameter for the sub-region and (2) an area of the sub-region. In step 730, based on spatial data included in the agronomic data sets, a pair of the data sets corresponding to a pair of overlapping portions of the farmable region is identified. The pair may include a first data set DS1 and a second data set DS2. In some cases, the data sets corresponding to the sub-region may include the second data set DS2, but not the first data set DS1. In step 740, based on temporal data associated with the pair of data sets, a determination is made as to which of the data sets in the pair is a second-pass data set. In step 750, an agronomic parameter value for the sub-region SR1 (e.g., the ratio between the aggregate parameter value for the sub-region and the area of the sub-region) is adjusted based on the pair of data sets. Some embodiments of each of the steps 710-750 are described in further detail below.

In step 710, agronomic data sets corresponding to portions of a farmable region are obtained. In some embodiments, each data set corresponds to a map element 302 of a map 300 of the farmable region. The map element corresponding to a data set represents the portion of the farmable region corresponding to the data set. In some embodiments, each data set includes (1) a value of an agronomic parameter (e.g., crop mass, etc.) of the corresponding portion of the farmable region, (2) spatial data indicating a location of the corresponding portion of the farmable region (e.g., latitude and longitude, coordinates in a two-dimensional or three-dimensional coordinate system, etc.), and (3) temporal data indicating a time associated with collection of the agronomic parameter value (e.g., the time at which a sensor measured the agronomic parameter value, the time at which a sensor measured underlying data from which the agronomic parameter value was subsequently derived, etc.). In some embodiments, the agronomic data sets are obtained from an agronomic database, wherein each agronomic data set is indexed based on the data set's spatial data.

In step 720, agronomic data for at least one sub-region SR1 of the farmable region are obtained. In some embodiments, the sub-region SR1 corresponds to a tile 304 of a map 300 of the farmable region. The sub-region SR1 includes portions of the farmable region corresponding to a subset of the agronomic data sets obtained in step 710. The agronomic data for the sub-region SR1 may indicate an aggregate value of an agronomic parameter (e.g., crop mass) of the sub-region, which may be determined by aggregating the agronomic parameter values of the data sets corresponding to the sub-region. In some embodiments, the agronomic data for the sub-region SR1 indicates an area of the sub-region and a ratio of the aggregate parameter value to the area of the sub-region. In some embodiments, the ratio represents the average crop density of the sub-region. In some embodiments, the agronomic data for the sub-region may include two of the three indicated quantities (e.g., the aggregate parameter value V and the area A, the aggregate parameter value V and the ratio R, or the area A and the ratio R), and the third indicated quantity may be determined by solving for that quantity in the expression R=V/A.

In step 730, based on at least some of the spatial data included in the plurality of agronomic data sets, at least one pair of the data sets corresponding to a pair of overlapping portions (P1, P2) of the farmable region is identified. The data sets corresponding to the sub-region SR1 may include one of the data sets in the pair (e.g., a "second data set" DS2) but not the other data set in the pair (e.g., a "first data set" DS1). For example, the tile corresponding to the sub-region may include the element corresponding to data set DS2, but the data set DS1 may correspond to an element included in a different tile. Thus, one of the data sets in the pair may be a first-pass data set collected by a harvester during a first pass through the overlapping area, and the other data set in the pair may be a second-pass data set collected by a harvester during a second pass through the overlapping area.

Pairs of data sets corresponding to overlapping portions of the farmable region may be identified using any suitable technique. As described above, each portion of the farmable region may have a width 306 ("W") (which may correspond to the width of a harvester that collected the data set of that portion of the region) and a length 308 ("L") (which may correspond to the distance traveled by the harvester between data collection operations). In some embodiments, the spatial data in each data set indicates the location of the center of the farmable portion corresponding to the data set. In some embodiments, a determination is made that two farmable portions Pa and Pb overlap at least in part if the distance between the center Ca of the farmable portion Pa and the center Cb of the farmable portion P2 in the width direction is less than W, and the distance between Ca and Cb in the length direction is less than L. Other techniques for determining whether a pair of portions overlap are possible.

The overlapping farmable portions corresponding to the pair of data sets may overlap in full or in part. The extent to which two farmable portions overlap (e.g., the proportion of each farmable portion that is included in the overlapping area) may be determined using any suitable technique.

In step 740, based on temporal data associated with the pair of data sets, a determination is made as to which of the data sets in the pair is a second-pass data set. As discussed above, the temporal data of the data sets indicate the times associated with collection of the agronomic parameter values of the data sets. In some embodiments, the data collection times are compared, and a determination is made that the data set with the later data collection time is a second-pass data set. (For convenience, in the remaining description of FIG. 7A, it is assumed that the "first data set" DS1 in the pair is a first-pass data set, and the "second data set" DS2 in the pair is a second-pass data set.)

In step 750, an agronomic parameter value for the sub-region SR1 is adjusted based on the pair of data sets to account for the overlapping area between the farmable portions P1 and P2 associated with the pair of data sets DS1 and DS2, respectively. For example, the sub-region's agronomic parameter value may be adjusted based on the value of the agronomic parameter in data set DS2 (the second-pass data set), the value of the agronomic parameter in data set DS1 (the first-pass data set), an area of the farmable portion P2 (the second-pass portion), and/or an extent to which the P1 and P2 overlap. The agronomic parameter value for the sub-region may be adjusted using any suitable technique, including but not limited to the options described in the following paragraphs.

Option 1: Add the First-Pass Data for the Overlapping Area to the Second-Pass Tile.

In some embodiments, at least a part of the agronomic parameter value of data set DS1 (the first-pass data set) is added to the aggregate agronomic parameter value for the sub-region SR1 (the sub-region represented by the second-pass tile), thereby adjusting the aggregate agronomic parameter value to include the first-pass data for the overlapping area. In some embodiments, the value that is added to the sub-region's aggregate agronomic parameter value is equal to the product of (1) the proportion of the area of portion P1 that overlaps the sub-region SR1, and (2) the agronomic parameter value of data set DS1. This calculation embodies an assumption that the agronomic parameter's value is substantially uniform throughout the portion P1. After adjusting the sub-region's aggregate agronomic parameter value, the ratio of the sub-region's adjusted aggregate value to the sub-region's area may be recalculated.

Option 2: Adjust the Second-Pass Tile to Exclude the Second-Pass Data.

In some embodiments, the area of the portion P2 (the second-pass portion) is subtracted from the area of the sub-region SR1 (the sub-region represented by the second-pass tile), thereby shrinking the area of sub-region SR1 to exclude the area the portion P2. Furthermore, the agronomic parameter value of data set DS2 may be subtracted from the aggregate agronomic parameter value of the sub-region SR1, thereby excluding the data collected in portion P2 from the sub-region's agronomic data. After adjusting the sub-region's area and aggregate agronomic parameter value, the ratio of the sub-region's adjusted aggregate value to the sub-region's area may be recalculated.

Optionally, another sub-region SR2 that includes the portion P1 can also be adjusted to include the portion P2. This approach may be particularly advantageous when data set DS2 includes some second-pass data (corresponding to the overlapping area of portion P2) and some first-pass data (corresponding to the non-overlapping area of portion P2), because this approach makes use of all the available first-pass data, thereby improving the accuracy of downstream analysis. The sub-region SR2 may be adjusted by (1) adding a part of the area of portion P2 to an area of the sub-region SR2, (2) adding the value of the agronomic parameter in data set DS2 to an aggregate agronomic parameter value of sub-region SR2, and (3) calculating a ratio of the adjusted aggregate value of sub-region SR2 to the adjusted area of sub-region SR2. In some embodiments, the part of the area of portion P2 added to the area of the sub-region SR2 is equal to a product of (1) a proportion of the area of portion P2 that does not overlap sub-region SR2, and (2) the area of portion P2. In this way, the area of the sub-region SR2 may be expanded to include the non-overlapping area of portion P2, which was not previously included in the sub-region SR2.

Alternatively, rather than adjusting the sub-region SR2 to include the portion of the farmable region corresponding to the second data set, the second data set may be discarded (e.g., removed from the agronomic database).

In some embodiments, the method 700 includes an additional step (not shown) of presenting a map of the farmable region (e.g., a map of the same type as the maps shown in FIGS. 3, 4, 6A, and 6B). The map may include a plurality of elements 302. The locations and areas of the elements may correspond to locations and areas of respective portions of the farmable region represented by the plurality of agronomic data sets. A visual attribute of each element may represent an agronomic parameter value (e.g., crop mass) of the corresponding portion of the farmable region. Any suitable visual attribute of an element may represent an agronomic parameter value, including but not limited to (1) the color, shade, tint, hue, brightness, or opaqueness of the element, and/or (2) text or other symbols associated with the element. Any suitable agronomic parameter value of a farmable portion may be represented.

The map may include at least one tile corresponding to a sub-region of the farmable region. The location of the tile may correspond to the location of the sub-region. The area of the tile may correspond to the area of the sub-region. A visual attribute of the tile may represent an agronomic parameter value for the sub-region (e.g., the aggregate agronomic parameter value or the ratio of the aggregate value to the area of the sub-region). Any suitable visual attribute of a tile may represent the aggregate agronomic parameter value or the ratio, including but not limited to (1) the color, shade, tint, hue, brightness, or opaqueness of the tile, and/or (2) text or other symbols associated with the tile. Any suitable agronomic parameter value of a sub-region may be represented.

The method 700 for adjusting an agronomic value associated with a farmable sub-region may be well-suited to scenarios in which agronomic data sets corresponding to the relevant portions (e.g., map elements 302) of the farmable region are available. In some scenarios, some or all of the agronomic data sets corresponding to the relevant portions (e.g., map elements) of the farmable region may not be available, but agronomic data corresponding to relevant sub-regions (e.g., tiles 304) of the farmable region may be available. In the latter scenario, agronomic values associated with farmable sub-regions may be adjusted based on estimates of agronomic values corresponding to relevant portions of a farmable region (e.g., relevant portions of the farmable region for which corresponding agronomic data sets are unavailable).

Figure 7B:
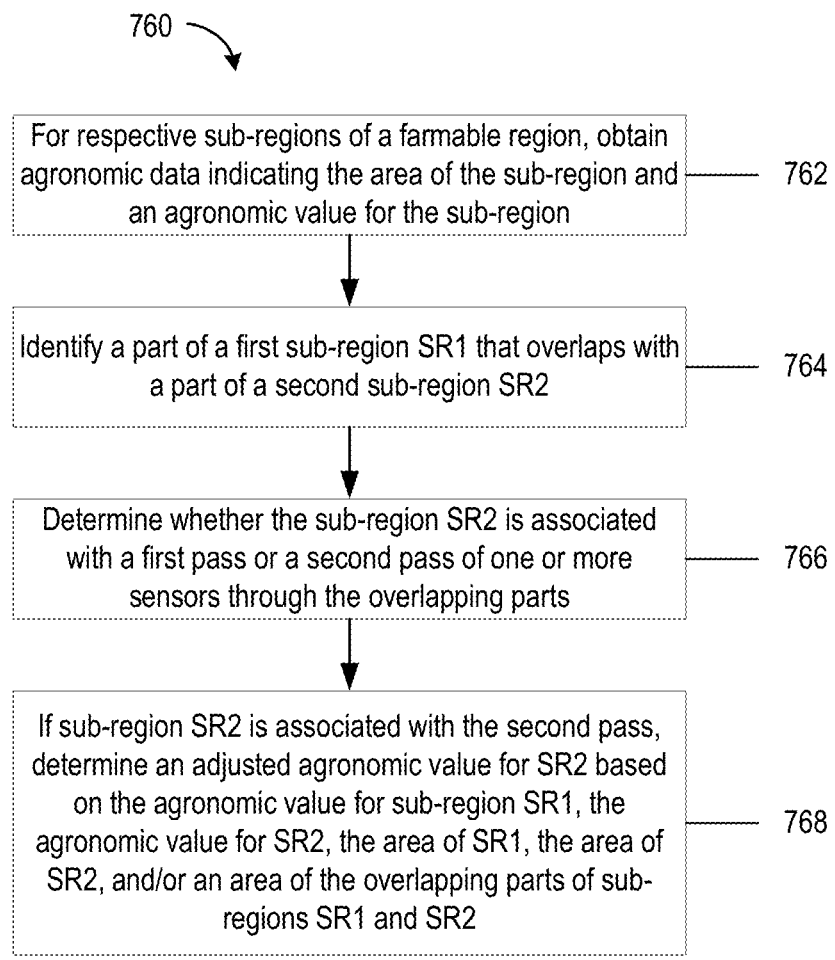
FIG. 7B is a flow chart of another method for adjusting an agronomic value associated with a farmable sub-region.

FIG. 7B illustrates a method 760 for adjusting an agronomic value associated with a farmable sub-region based on agronomic data sets and/or estimated agronomic values corresponding to portions of the farmable region. Referring to FIG. 7B, the method 760 may include steps 762-768. In step 762, agronomic data are obtained for a plurality of sub-regions SR of a farmable region. For each sub-region SR, the agronomic data indicate the area of the sub-region and an agronomic value for the sub-region, for example, an aggregate value of an agronomic parameter aggregated over the portions of the farmable region included in the sub-region (e.g., crop mass), a ratio of the aggregated value for the sub-region to the area of the sub-region (e.g., crop mass density), etc. In step 764, overlapping parts of two of the sub-regions (a first sub-region SR1 and a second sub-region SR2) are identified. In step 766, a determination is made as to whether sub-region SR2 is associated with a first pass or a second pass by one or more sensors (e.g., of a harvester) through the overlapping parts of sub-regions SR1 and SR2. A sub-region SR may be associated with a second pass, for example, if the agronomic value for the sub-region SR is derived from at least one second-pass data set. Otherwise, the sub-region SR may be associated with a first pass. In step 768, if the sub-region SR2 is associated with the second pass, an adjusted agronomic value for the second sub-region is determined based on the value for the first sub-region, the value for the second sub-region, the area of the first sub-region, the area of the second sub-region, and/or an area of the overlapping parts of the first and second sub-regions. Some embodiments of the steps 762-768 are described in further detail below.

In step 762, agronomic data are obtained for a plurality of sub-regions SR of a farmable region. Any suitable technique for obtaining agronomic data for a plurality of sub-regions (e.g., tiles) of a farmable region may be used, including but not limited to retrieving the agronomic data from a database, calculating the agronomic data based on agronomic data sets corresponding to portions (e.g., map elements) of the farmable region, etc.

In step 764, overlapping parts of two of the sub-regions (a first sub-region SR1 and a second sub-region SR2) are identified. Any suitable technique for identifying a part (e.g., one or more portions) of the farmable region in which the sub-regions SR1 and SR2 overlap may be used. In some embodiments, the agronomic data for the sub-regions may include spatial data indicating locations of the sub-regions (e.g., latitude and longitude, coordinates in a two-dimensional or three-dimensional coordinate system, etc.), and the spatial data may be analyzed to identify parts of the farmable region in which sub-regions overlap. In some embodiments, agronomic data sets corresponding to portions of the farmable region may be obtained. Such data sets may include spatial data indicating locations of the portions of the farmable region included in the sub-regions, and such spatial data may be analyzed to identify parts (e.g., one or more portions) of the farmable region in which sub-regions overlap.

In step 766, a determination is made as to whether sub-region SR2 is associated with a first pass or a second pass by one or more sensors (e.g., of a harvester) through the overlapping parts of sub-regions SR1 and SR2. In some embodiments, sub-region SR2 is determined to be associated with a second pass if the agronomic value for sub-region SR1 is derived from data collected by the sensors from the overlapping part at a first time, and the agronomic value for sub-region SR2 is derived from data collected by the sensors from the overlapping part at a second time subsequent to the first time. By contrast, if the agronomic value for sub-region SR2 is derived from data collected by the sensors from the overlapping part at a first time, and the agronomic value for sub-region SR1 is derived from data collected by the sensors from the overlapping part at a second time subsequent to the first time, SR2 may be determined to be associated with a first pass.

In step 768, if the sub-region SR2 is associated with the second pass, an adjusted agronomic value for sub-region SR2 is determined based on the value for sub-region SR1, the value for sub-region SR2, the area of sub-region SR1, the area of sub-region SR2, and/or an area of the part of the farmable region ("overlapping part") in which sub-regions SR1 and SR overlap. In some embodiments, determining the adjusted agronomic value includes determining a first-pass agronomic value ("first-pass value") and/or a second-pass agronomic value ("second-pass value") for the overlapping part of the farmable region. The first-pass value for the overlapping part may include, for example, an aggregate value $V_{1P}$ of an agronomic parameter for the overlapping part, a ratio of the aggregate value $V_{1P}$ to the area of the overlapping part, etc.

In some embodiments, the first-pass value for the overlapping part is estimated based on the agronomic data for sub-region SR1, without using agronomic data sets corresponding to portions of sub-region SR1. For example, it may be assumed that an agronomic parameter of the sub-region SR1 (e.g., crop mass density) is uniform throughout the sub-region. Consistent with such an assumption, the ratio between (1) the aggregate value $V_{1P}$ for the overlapping part, and (2) the area of the overlapping part may be estimated to be equal to the corresponding ratio for sub-region SR1. In addition or in the alternative, the aggregate value $V_{1P}$ for the overlapping part may be estimated to be equal to (1) a product of the area of the overlapping part and the ratio for sub-region SR1, or (2) a product of (i) a ratio of the area of the overlapping part to the area of sub-region SR1 and (ii) the aggregate value for sub-region SR1.

In some embodiments, the first-pass value for the overlapping part is determined based on agronomic data sets corresponding to portions of sub-region SR1. Data sets corresponding to portions of the farmable region may be obtained, for example, from an agronomic database. As described above, each data set may include (1) a value of an agronomic parameter for the corresponding portion of the farmable region, and (2) spatial data indicating a location of the corresponding portion of the farmable region. A subset $S_1$ of the agronomic data sets corresponding to portions of the farmable region included in sub-region SR1 may be identified. A subset $S_{1P}$ of the agronomic data sets corresponding to portions of sub-region SR1 included in the overlapping part of the farmable region may be identified. The aggregate value $V_{1P}$ of an agronomic parameter for the overlapping part may be determined based, at least in part, on the subset $S_{1P}$ of agronomic data sets. For example, the aggregate value $V_{1P}$ may be the sum of the values of the agronomic parameter for the data sets included in subset $S_{1P}$.

In some embodiments, determining the adjusted agronomic value for the overlapping part includes determining a second-pass agronomic value ("second-pass value") for the overlapping part. The second-pass value for the overlapping part may include, for example, an aggregate value $V_{2P}$ of an agronomic parameter for the overlapping part, a ratio of the aggregate value $V_{2P}$ to the area of the overlapping part, etc.

In some embodiments, the second-pass value for the overlapping part is estimated based on the agronomic data for sub-region SR2, without using agronomic data sets corresponding to portions of sub-region SR2. For example, the second-pass value may be estimated based on the efficiency (E) of farming equipment (e.g., harvesting equipment) used in the overlapping part during the first pass and the second pass. The efficiency of the farming equipment may be determined using any suitable technique. For example, data indicative of the efficiency of the equipment may be obtained from a third party (e.g., the equipment's manufacturer). Alternatively or in addition, the efficiency E of harvesting equipment may be determined by deliberately harvesting a selected sub-region twice, as described above. In some embodiments, the ratio of the aggregate value $V_{2P}$ to the area of the overlapping part is estimated to be the product of (1) the ratio of the aggregate value $V_{1P}$ to the area of the overlapping part, and (2) the quantity (1−E)/E. In some embodiments, the aggregate value $V_{2P}$ may be estimated to be the product of (1) the area of the overlapping part, and (2) the ratio of the aggregate value $V_{2P}$ to the area of the overlapping part.

In some embodiments, the second-pass value for the overlapping part is determined based on agronomic data sets corresponding to portions of sub-region SR2. Data sets corresponding to portions of the farmable region may be obtained, for example, from an agronomic database. As described above, each data set may include (1) a value of an agronomic parameter for the corresponding portion of the farmable region, and (2) spatial data indicating a location of the corresponding portion of the farmable region. A subset $S_2$ of the agronomic data sets corresponding to portions of the farmable region included in sub-region SR2 may be identified. A subset $S_{2P}$ of the agronomic data sets corresponding to portions of sub-region SR2 included in the overlapping part of the farmable region may be identified. The aggregate value $V_{2P}$ of an agronomic parameter for the overlapping part may be determined based, at least in part, on the subset $S_{2P}$ of agronomic data sets. For example, the aggregate value $V_{2P}$ may be the sum of the values of the agronomic parameter for the data sets included in subset $S_{2P}$.

Having determined the first-pass value and the second-pass value of an agronomic parameter for the overlapping part of the farmable region, the value of the agronomic parameter for sub-region SR2 may, in some embodiments, be adjusted in accordance with "Option 1," such that data collected during the first pass through the overlapping part of the farmable region is incorporated into the tile for sub-region SR2. In some embodiments, the aggregate value $V_{1P}$ of the agronomic parameter for the overlapping part of the farmable region may be added to the aggregate value of the agronomic parameter for sub-region SR2, thereby adjusting the aggregate value of the agronomic parameter for sub-region SR2 to incorporate the data collected during the first pass through the overlapping part. In addition, the aggregate value $V_{2P}$ of the agronomic parameter for the overlapping part of the farmable region may be subtracted from the aggregate value of the agronomic parameter for sub-region SR2, thereby adjusting the aggregate value of the agronomic parameter for sub-region SR2 to exclude the data collected during the second pass through the overlapping part. In some embodiments, a ratio of the adjusted aggregate value for sub-region SR2 to the area of sub-region SR2 may be calculated, thereby adjusting the ratio for sub-region SR2.

In some embodiments, the value of the agronomic parameter for sub-region SR2 may be adjusted in accordance with "Option 2," such that the tile for sub-region SR2 excludes the area of the overlapping part and agronomic data corresponding to the overlapping part. In some embodiments, the area of the overlapping part may be subtracted from the area of sub-region SR2, thereby adjusting the area of sub-region SR2 to exclude the area of the overlapping part. In addition, the aggregate value $V_{2P}$ of the agronomic parameter for the overlapping part of the farmable region may be subtracted from the aggregate value of the agronomic parameter for sub-region SR2, thereby adjusting the aggregate value of the agronomic parameter for sub-region SR2 to exclude the second-pass data for the overlapping part. In some embodiments, a ratio of the (adjusted or unadjusted) aggregate value for sub-region SR2 to the adjusted area of sub-region SR2 may be calculated, thereby adjusting the ratio for sub-region SR2.

One of ordinary skill in the art will appreciate that other features described above with reference to some embodiments of the method 700 may also be used in combination with some embodiments of the method 760. For example, if the agronomic parameter for sub-region SR2 is adjusted in accordance with Option 2, the agronomic parameter for sub-region SR1 may also be adjusted to include the second-pass data for the overlapping part. Alternatively, the second-pass data for the overlapping part may be discarded. As another example, the method 760 may include an additional step of presenting a map of the farmable region.

In the foregoing discussion, "crop mass" is sometimes used as an example of an agronomic parameter corresponding to a tile. The techniques described herein are not limited to applications involving crop mass; any suitable agronomic parameter corresponding to a tile may be used.

In some examples, the center of mass of a tile can be relevant for downstream analysis. In some embodiments, the location of the center of mass of an adjusted tile is recalculated to account for any adjustments to the tile's shape or area, and/or any adjustments to the crop mass corresponding to the tile.

In some examples, there can be a time lag between the time at which a harvester passes over a portion of a farmable region and the time at which the agronomic parameter measurement for that portion of the farmable region is recorded. The identification of second-pass data sets can take into account this time lag. For instance, a Markov model or other type of mixture model can be used to correlate the temporal data contained in the data sets with accurate spatial data.

In some examples, the identification of second-pass data sets can be performed more quickly and/or efficiently by using a spatial tree, for example a quad tree or a k-d tree.

In some examples, the identified second-pass data sets can be retained across years, e.g., in cases in which the farm machinery follows a known and consistent path through the farmable region. In these cases, the relatively time-intensive tasks of identifying second-pass elements and adjusting tile areas need not occur every year, thereby enabling agronomic parameter values (e.g., crop yield densities) to be determined more quickly.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 8:
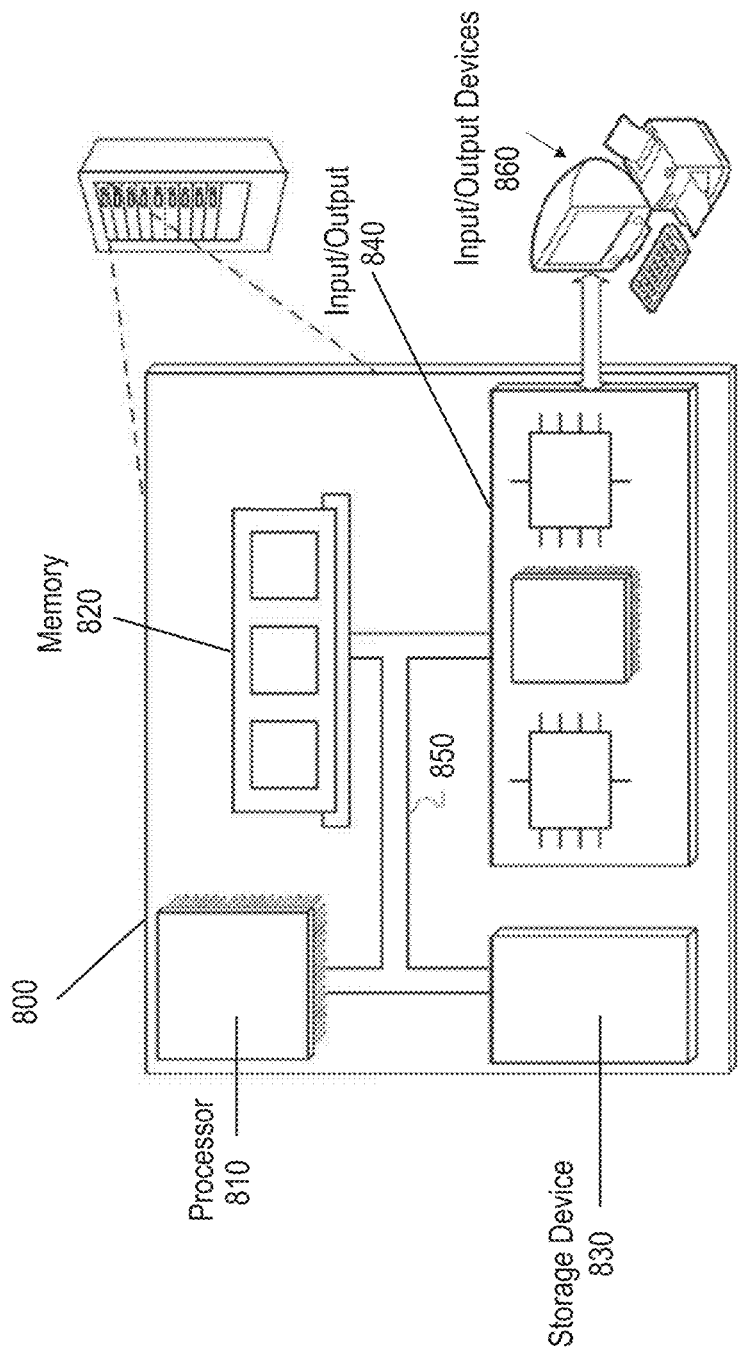
FIG. 8 is a diagram of an example of a computer system.

FIG. 8 is a block diagram of an example computer system 800 that may be used in implementing the technology described in this document. General-purpose computers, network appliances, mobile devices, or other electronic systems may also include at least portions of the system 800. The system 800 includes a processor 810, a memory 820, a storage device 830, and an input/output device 840. Each of the components 810, 820, 830, and 840 may be interconnected, for example, using a system bus 850. The processor 810 is capable of processing instructions for execution within the system 800. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a non-transitory computer-readable medium. In some implementations, the memory 820 is a volatile memory unit. In some implementations, the memory 820 is a nonvolatile memory unit.

The storage device 830 is capable of providing mass storage for the system 800. In some implementations, the storage device 830 is a non-transitory computer-readable medium. In various different implementations, the storage device 830 may include, for example, a hard disk device, an optical disk device, a solid-date drive, a flash drive, or some other large capacity storage device. For example, the storage device may store long-term data (e.g., database data, file system data, etc.). The input/output device 840 provides input/output operations for the system 800. In some implementations, the input/output device 840 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 860. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 830 may be implemented in a distributed way over a network, such as a server farm or a set of widely distributed servers, or may be implemented in a single computing device.

Although an example processing system has been described in FIG. 8, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of" "only one of" or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for correcting agronomic data associated with a farmable region, the method comprising:
    obtaining a plurality of agronomic data sets, wherein each of the agronomic data sets corresponds to a respective portion of the farmable region and includes (1) a value of an agronomic parameter of the portion of the farmable region, (2) spatial data indicating a location of the portion of the farmable region, and (3) temporal data indicating a time associated with measurement of the agronomic parameter value;
    obtaining, for at least one sub-region of the farmable region, agronomic data indicating an area of the sub-region and a value for the sub-region comprising (1) an aggregate value of the agronomic parameter for the sub-region determined based on the agronomic parameter values in a subset of the agronomic data sets corresponding to portions of the farmable region included in the sub-region and/or (2) a ratio of the aggregate value to the area of the sub-region;
    identifying, based on at least some of the spatial data of the agronomic data sets, at least one pair of the data sets corresponding to a pair of at least partially overlapping portions of the farmable region, the pair of data sets including a first data set not included in the subset of data sets corresponding to the sub-region and a second data set included in the subset;
    determining, based on the temporal data associated with the pair of data sets, which of the agronomic parameter values of the pair of data sets was measured earlier in time, and which of the agronomic parameter values of the pair of data sets was measured later in time; and
    in a case in which the agronomic parameter value of the second data set was measured later in time, determining a corrected value for the sub-region based, at least in part, on the value of the agronomic parameter in the second data set, the value of the agronomic parameter in the first data set, an area of the portion of the farmable region corresponding to the second data set, and/or an extent to which the overlapping portions of the farmable region overlap.

2. The method of claim 1, wherein determining the corrected value for the sub-region comprises:
    adding at least a part of the value of the agronomic parameter in the first data set to the aggregate value of the agronomic parameter for the sub-region, thereby obtaining an adjusted aggregate value of the agronomic parameter for the sub-region; and
    calculating a ratio of the adjusted aggregate value to the area of the sub-region, thereby obtaining the corrected value.

3. The method of claim 2, wherein adding at least a part of the value of the agronomic parameter in the first data set to the aggregate value comprises:
    determining a proportion of an area of the portion of the farmable region corresponding to the first data set that overlaps the sub-region;
    determining a product of the proportion and the value of agronomic parameter in the first data set; and
    adding the product to the aggregate value.

4. The method of claim 2, wherein determining the corrected value for the sub-region further comprises:
    prior to obtaining the corrected value for the sub-region, subtracting the value of the agronomic parameter in the second data set from the adjusted aggregate value of the agronomic parameter for the sub-region.

5. The method of claim 1, wherein determining the corrected value for the sub-region comprises:
    subtracting an area of the portion of the farmable region corresponding to the second data set from the area of the sub-region, thereby obtaining an adjusted area of the sub-region;
    subtracting the value of the agronomic parameter in the second data set from the aggregate value of the agronomic parameter for the sub-region, thereby obtaining an adjusted aggregate value of the agronomic parameter for the sub-region; and
    calculating a ratio of the adjusted aggregate value to the adjusted area of the sub-region, thereby obtaining the corrected value.

6. The method of claim 5, further comprising:
    adding a part of the area of the portion of the farmable region corresponding to the second data to an area of another sub-region, thereby obtaining an adjusted area of the other sub-region;
    adding the value of the agronomic parameter in the second data set to an aggregate value of the agronomic parameter for the other sub-region, thereby obtaining an adjusted aggregate value of the agronomic parameter for the other sub-region; and
    calculating an adjusted ratio of the adjusted aggregate value of the other sub-region to the adjusted area of the other sub-region.

7. The method of claim 6, wherein the part of the area of the portion of the farmable region corresponding to the second data set is equal to a product of (1) a proportion of the area of the portion of the farmable region corresponding to the second data set that does not overlap the other sub-region, and (2) the area of the portion of the farmable region corresponding to the second data set.

8. The method of claim 5, wherein the plurality of agronomic data sets is obtained from an agronomic database, and wherein the method further comprises removing the second data set from the agronomic database.

9. The method of claim 1, wherein the agronomic parameter value of each of the agronomic data sets comprises a crop mass value collected by a harvester, and wherein the ratio of the aggregate value to the area of the sub-region comprises a crop yield density value.

10. A computer-implemented method for correcting agronomic data associated with a farmable region, the method comprising:
for each sub-region in a plurality of sub-regions of the farmable region, obtaining respective agronomic data indicating an area of the sub-region and a value for the sub-region, wherein the value for the sub-region comprises (1) an aggregate value of an agronomic parameter for the sub-region derived from data collected by one or more sensors during a pass through the sub-region and/or (2) a ratio of the aggregate value to the area of the sub-region;
identifying a part of a first sub-region that overlaps with a part of a second sub-region, wherein the first and second sub-regions are included in the plurality of sub-regions;
determining whether the second sub-region is associated with a first-in-time pass by the one or more sensors through the overlapping parts of the first and second sub-regions or a second-in-time pass by the sensors through the overlapping parts; and
in a case in which the second sub-region is associated with the second-in-time pass, determining a corrected value for the second sub-region based, at least in part, on the value for the first sub-region, the value for the second sub-region, the area of the first sub-region, the area of the second sub-region, and/or an area of the overlapping parts of the first and second sub-regions.

11. The method of claim 10, wherein the value for the first sub-region is derived from data collected by the sensors at a first time, wherein the value for the second sub-region is derived from data collected by the sensors at a second time, and wherein the value for the second sub-region is determined to be associated with the first-in-time pass if the second time is earlier than the first time.

12. The method of claim 10, wherein determining the corrected value for the second sub-region comprises: determining a first-pass value for the overlapping parts of the first and second sub-regions, wherein the first-pass value for the overlapping parts comprises (1) a first-pass aggregate value of the agronomic parameter for the overlapping parts and/or (2) a first-pass ratio of the first-pass aggregate value to the area of the overlapping parts.

13. The method of claim 12, wherein the first-pass value for the overlapping parts is determined based, at least in part, on the area of the first sub-region, the area of the overlapping parts of the first and second sub-regions, and/or the value for the first sub-region.

14. The method of claim 13, wherein the first-pass value for the overlapping parts comprises the first-pass ratio of the first-pass aggregate value to the area of the overlapping parts, wherein the value for the first sub-region comprises the ratio of the aggregate value to the area of the sub-region, and wherein determining the first-pass value comprises estimating that the first-pass ratio is equal to the ratio for the first sub-region.

15. The method of claim 13, wherein the value for the first sub-region comprises the ratio of the aggregate value to the area of the sub-region, and wherein determining the first-pass value comprises estimating that the first-pass aggregate value is equal to (1) a product of the area of the overlapping parts and the ratio for the first sub-region or (2) a product of (i) a ratio of the area of the overlapping parts to the area of the first sub-region and (ii) the aggregate value for the first sub-region.

16. The method of claim 12, further comprising obtaining a plurality of agronomic data sets, wherein each of the agronomic data sets corresponds to a respective portion of the farmable region and includes (1) a value of the agronomic parameter for the portion of the farmable region and (2) spatial data indicating a location of the portion of the farmable region, and wherein a first subset of the agronomic data sets corresponds to portions of the farmable region included in the first sub-region, and wherein the aggregate value of the agronomic parameter for the first sub-region is determined based on the agronomic parameter values in the first subset of agronomic data sets.

17. The method of claim 16, wherein a first-pass subset of the agronomic data sets corresponds to one or more portions of the farmable region included in the first sub-region and in the overlapping parts of the first and second sub-regions, and wherein the first-pass aggregate value of the agronomic parameter for the overlapping parts of the first and second sub-regions is determined based, at least in part, on the first-pass subset of agronomic data sets.

18. The method of claim 12, wherein determining the corrected value for the second sub-region further comprises: determining a second-pass value for the overlapping parts of the first and second sub-regions, wherein the second-pass value for the overlapping parts comprises (1) a second-pass aggregate value of the agronomic parameter for the overlapping parts and/or (2) a second-pass ratio of the second-pass aggregate value to the area of the overlapping parts.

19. The method of claim 18, wherein the second-pass value for the overlapping parts is determined based, at least in part, on an efficiency (E) of a harvesting operation performed in the overlapping parts during the first-in-time pass and the second-in-time pass.

20. The method of claim 19, wherein the first-pass value for the overlapping parts comprises the first-pass ratio of the first-pass aggregate value to the area of the overlapping parts, wherein the second-pass value for the overlapping parts comprises the second-pass ratio of the second-pass aggregate value to the area of the overlapping parts, and wherein determining the second-pass value comprises estimating the second-pass ratio as a product of (i) the first-pass ratio and (ii) $(1-E)/E$.

21. The method of claim 19, wherein the second-pass value for the overlapping parts comprises the second-pass ratio of the second-pass aggregate value to the area of the overlapping parts, and wherein determining the second-pass value comprises estimating the second-pass aggregate value as a product of the area of the overlapping parts and the second-pass ratio.

22. The method of claim 18, further comprising obtaining a plurality of agronomic data sets, wherein each of the agronomic data sets corresponds to a respective portion of the farmable region and includes (1) a value of the agronomic parameter for the portion of the farmable region and (2) spatial data indicating a location of the portion of the farmable region, and wherein a second subset of the agronomic data sets corresponds to portions of the farmable region included in the second sub-region, and wherein the aggregate value of the agronomic parameter for the second sub-region is determined based on the agronomic parameter values in the second subset of agronomic data sets.

23. The method of claim 22, wherein a second-pass subset of the agronomic data sets corresponds to one or more portions of the farmable region included in the second sub-region and in the overlapping parts of the first and second sub-regions, and wherein the second-pass aggregate value of the agronomic parameter for the overlapping parts of the first and second sub-regions is determined based, at least in part, on the second-pass subset of agronomic data sets.

24. The method of claim 18, wherein determining the corrected value for the second sub-region comprises:
adding the first-pass aggregate value to the aggregate value for the second sub-region, thereby obtaining an adjusted aggregate value for the second sub-region; and
calculating a ratio of the adjusted aggregate value for the second sub-region to the area of the second sub-region, thereby obtaining the corrected value for the second sub-region.

25. The method of claim 24, wherein determining the corrected value for the second sub-region further comprises:
prior to obtaining the corrected value for the second sub-region, subtracting the second-pass aggregate value from the adjusted aggregate value for the second sub-region.

26. The method of claim 18, wherein determining the corrected value for the second sub-region comprises:
subtracting the area of the overlapping parts of the first and second sub-regions from the area of the second sub-region, thereby obtaining an adjusted area of the second sub-region; and
calculating a ratio of the aggregate value for the second sub-region to the adjusted area of the second sub-region, thereby obtaining the corrected value for the second sub-region.

27. The method of claim 26, wherein determining the corrected value for the second sub-region further comprises:
prior to obtaining the corrected value for the second sub-region, subtracting the second-pass aggregate value from the aggregate value for the second sub-region.

28. The method of claim 10, wherein determining the corrected value for the second sub-region comprises:
adding a first-pass aggregate value of the agronomic parameter for the overlapping parts to the aggregate value for the second sub-region, thereby obtaining an adjusted aggregate value for the second sub-region, and
calculating a ratio of the adjusted aggregate value for the second sub-region to the area of the second sub-region, thereby obtaining the corrected value for the second sub-region.

29. The method of claim 10, wherein determining the corrected value for the second sub-region comprises:
subtracting the area of the overlapping parts of the first and second sub-regions from the area of the second sub-region, thereby obtaining an adjusted area of the second sub-region; and
calculating a ratio of the aggregate value for the second sub-region to the adjusted area of the second sub-region, thereby obtaining the corrected value for the second sub-region.

30. A system comprising:
one or more computers and one or more storage devices storing instructions that are operable, when executed by the one or more computers, to cause the one or more computers to perform operations for correcting agronomic data associated with a farmable region, the operations including:
for each sub-region in a plurality of sub-regions of the farmable region, obtaining respective agronomic data indicating an area of the sub-region and a value for the sub-region, wherein the value for the sub-region comprises (1) an aggregate value of an agronomic parameter for the sub-region derived from data collected by one or more sensors during a pass through the sub-region and/or (2) a ratio of the aggregate value to the area of the sub-region;
identifying a part of a first sub-region that overlaps with a part of a second sub-region, wherein the first and second sub-regions are included in the plurality of sub-regions;
determining whether the second sub-region is associated with a first-in-time pass by the one or more sensors through the overlapping parts of the first and second sub-regions or a second-in-time pass by the sensors through the overlapping parts; and
in a case in which the second sub-region is associated with the second-in-time pass, determining a corrected value for the second sub-region based, at least in part, on the value for the first sub-region, the value for the second sub-region, the area of the first sub-region, the area of the second sub-region, and/or an area of the overlapping parts of the first and second sub-regions.

* * * * *